(12) United States Patent
Le Saint

(10) Patent No.: US 12,225,115 B2
(45) Date of Patent: *Feb. 11, 2025

(54) SECURE SHARED KEY ESTABLISHMENT FOR PEER TO PEER COMMUNICATIONS

(71) Applicant: Visa International Service Association, San Francisco, CA (US)

(72) Inventor: Eric Le Saint, San Francisco, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/149,565

(22) Filed: Jan. 3, 2023

(65) Prior Publication Data
US 2023/0155821 A1 May 18, 2023

Related U.S. Application Data

(63) Continuation of application No. 16/644,158, filed as application No. PCT/US2017/053837 on Sep. 27, 2017, now Pat. No. 11,563,567.

(51) Int. Cl.
*H04L 9/08* (2006.01)
*G06F 9/4401* (2018.01)
(Continued)

(52) U.S. Cl.
CPC .............. *H04L 9/085* (2013.01); *G06F 9/442* (2013.01); *G06F 21/602* (2013.01);
(Continued)

(58) Field of Classification Search
CPC ..... H04L 9/085; H04L 9/0863; H04L 9/0869; H04L 9/0897; H04L 9/3247;
(Continued)

(56) References Cited

U.S. PATENT DOCUMENTS 5,606,609 A 2/1997 Houser et al.
6,084,969 A * 7/2000 Wright ................ H04W 88/185
713/153
(Continued)

FOREIGN PATENT DOCUMENTS

CN 108075896 A 5/2018
CN 110378128 A 10/2019
(Continued)

OTHER PUBLICATIONS

Shushan Zhao, "A Survey of Applications of Identity-Based Cryptography in Mobile Ad-Hoc Networks", Published in: IEEE Communications Surveys & Tutorials ( vol. 14, Issue: 2, Second Quarter 2012), Date of Publication: Mar. 24, 2011, 21 pages (Year: 2011).*
(Continued)

*Primary Examiner* — Shahriar Zarrineh
(74) *Attorney, Agent, or Firm* — Kilpatrick Townsend & Stockton LLP

(57) ABSTRACT

Systems and methods for secure peer-to-peer communications are described. Devices registered into trusted network may be capable of establishing a shared data encryption key (DEK). In embodiments, each device may be configured to obtain a share of a data encryption key (DEKi) that can be stored locally. The shares may be shares in an M of N Secret Sharing Scheme. This may involve a network that includes an integer, N, devices, and in which M devices may share a secret (i.e. the DEK) during communications, M being an integer less than or equal to N. To obtain the entire DEK during encryption/decryption, a requesting device may send requests to M of N devices for their shares of the DEK. Once M shares are obtained, they may be used generate the DEK for encrypting/decrypting data between the devices.

20 Claims, 12 Drawing Sheets

(51) Int. Cl.
*G06F 21/60* (2013.01)
*H04L 9/32* (2006.01)

(52) U.S. Cl.
CPC .......... *H04L 9/0863* (2013.01); *H04L 9/0869* (2013.01); *H04L 9/0897* (2013.01); *H04L 9/3247* (2013.01); *H04L 9/3263* (2013.01); H04L 2209/84 (2013.01)

(58) Field of Classification Search
CPC .............. H04L 9/3263; H04L 2209/84; H04L 2209/805; H04L 9/3226; H04L 9/0825; H04L 9/0861; G06F 9/442; G06F 21/602
See application file for complete search history.

(56) References Cited

U.S. PATENT DOCUMENTS

| | | | |
|---|---|---|---|
| 6,240,513 | B1 | 5/2001 | Friedman et al. |
| 6,868,160 | B1 | 3/2005 | Raji |
| 6,901,512 | B2 | 5/2005 | Kurn et al. |
| 8,538,029 | B2* | 9/2013 | Li .......................... H04L 9/085 380/279 |
| 9,449,177 | B1 | 9/2016 | El Defrawy et al. |
| 9,455,968 | B1* | 9/2016 | Machani ............ H04L 63/0428 |
| 9,461,821 | B1 | 10/2016 | Machani et al. |
| 9,641,328 | B1 | 5/2017 | Bennett et al. |
| 9,648,012 | B1* | 5/2017 | Machani ............... H04L 9/3218 |
| 9,667,416 | B1* | 5/2017 | Machani ............... H04L 9/3215 |
| 9,673,975 | B1* | 6/2017 | Machani ............... H04L 9/0822 |
| 9,813,243 | B1 | 11/2017 | Triandopoulos et al. |
| 10,289,835 | B1* | 5/2019 | Machani ............ H04L 63/0861 |
| 10,454,674 | B1 | 10/2019 | Bar-El et al. |
| 10,516,527 | B1* | 12/2019 | Machani ............... H04L 9/0625 |
| 10,848,304 | B2* | 11/2020 | Chumbley .............. H04L 9/088 |
| 11,115,196 | B1 | 9/2021 | Triandopoulos et al. |
| 2002/0039419 | A1 | 4/2002 | Akimoto et al. |
| 2004/0153642 | A1 | 8/2004 | Plotkin et al. |
| 2004/0179684 | A1 | 9/2004 | Appenzeller et al. |
| 2006/0156012 | A1 | 7/2006 | Beeson |
| 2007/0081667 | A1 | 4/2007 | Hwang |
| 2007/0189527 | A1 | 8/2007 | Brown et al. |
| 2008/0148047 | A1 | 6/2008 | Appenzeller et al. |
| 2009/0254750 | A1* | 10/2009 | Bono .................... H04L 63/065 380/282 |
| 2009/0323967 | A1 | 12/2009 | Peirce et al. |
| 2010/0017593 | A1* | 1/2010 | Putz ...................... H04L 9/3073 713/150 |
| 2011/0002461 | A1 | 1/2011 | Erhart et al. |
| 2011/0016318 | A1* | 1/2011 | Syngkon ................ G06Q 10/08 340/572.1 |
| 2011/0107106 | A1* | 5/2011 | Morii .................... G06F 21/606 709/219 |
| 2013/0086642 | A1* | 4/2013 | Resch .................... H04L 9/321 726/4 |
| 2013/0145151 | A1* | 6/2013 | Brown .................. H04L 9/3265 713/156 |
| 2013/0212393 | A1* | 8/2013 | D'Souza ............... H04L 9/0891 713/171 |
| 2014/0068252 | A1* | 3/2014 | Maruti .................. H04L 9/0866 713/162 |
| 2014/0147198 | A1* | 5/2014 | Kim ........................ E04C 5/165 403/361 |
| 2014/0250303 | A1 | 9/2014 | Miller et al. |
| 2014/0380040 | A1 | 12/2014 | Albahdal et al. |
| 2015/0052369 | A1 | 2/2015 | Koning et al. |
| 2015/0095648 | A1 | 4/2015 | Nix |
| 2015/0312759 | A1 | 10/2015 | Kim et al. |
| 2015/0372813 | A1 | 12/2015 | Brand |
| 2016/0080157 | A1 | 3/2016 | Lundström |
| 2016/0094540 | A1* | 3/2016 | Camenisch ............. H04L 9/085 726/8 |
| 2016/0192194 | A1 | 6/2016 | Yang |
| 2016/0241390 | A1 | 8/2016 | Harris et al. |
| 2016/0337124 | A1* | 11/2016 | Rozman .............. G06F 21/6209 |
| 2016/0359820 | A1 | 12/2016 | Bender |
| 2017/0093564 | A1 | 3/2017 | Bernat et al. |
| 2017/0141924 | A1* | 5/2017 | Ryu ....................... H04L 9/3236 |
| 2017/0222805 | A1 | 8/2017 | Telford et al. |
| 2017/0250972 | A1* | 8/2017 | Ronda ................... H04L 9/0891 |
| 2018/0004930 | A1 | 1/2018 | Csinger et al. |
| 2018/0097783 | A1* | 4/2018 | Haldenby ........... H04L 63/0442 |
| 2018/0176188 | A1* | 6/2018 | Zhu ....................... H04L 9/3271 |
| 2019/0089720 | A1* | 3/2019 | Aditham ............. G06F 16/9014 |
| 2019/0116028 | A1 | 4/2019 | Liu |

FOREIGN PATENT DOCUMENTS

| | | |
|---|---|---|
| JP | 2002271311 A | 9/2002 |
| JP | 4485122 B2 | 4/2010 |
| KR | 1020150123672 A | 11/2015 |
| WO | 2005010732 A2 | 2/2005 |
| WO | 2015163735 A1 | 10/2015 |
| WO | 2016115633 A1 | 7/2016 |

OTHER PUBLICATIONS

Kaiying Feng, "Improving availability and confidentiality of shared data under the multi-cloud environment", Published in: 2017 IEEE 2nd International Conference on Cloud Computing and Big Data Analysis (ICCCBDA), Date of Conference: Apr. 28-30, 2017, 5 pages (Year: 2017).*
U.S. Appl. No. 16/644,158 , First Action Interview Office Action Summary, Mailed On Apr. 4, 2022, 9 pages.
U.S. Appl. No. 16/644,158 , First Action Interview Pilot Program Pre-Interview Communication, Mailed On Nov. 19, 2021, 8 pages.
U.S. Appl. No. 16/644,158 , Notice of Allowance, Mailed On Sep. 20, 2022, 16 pages.
Application No. EP17927612.6 , Extended European Search Report, Mailed On Aug. 7, 2020, 8 pages.
Application No. EP17927612.6 , Office Action, Mailed On Jun. 30, 2021, 6 pages.
Application No. PCT/US2017/053837 , International Preliminary Report on Patentability, Mailed On Apr. 9, 2020, 12 pages.
Application No. PCT/US2017/053837 , International Search Report and Written Opinion, Mailed On Feb. 23, 2018, 15 pages.

* cited by examiner

SECURE SHARED KEY ESTABLISHMENT FOR PEER TO PEER COMMUNICATIONS

CROSS REFERENCE TO RELATED APPLICATIONS

This application is a continuation of U.S. patent application Ser. No. 16/644,158 filed Mar. 3, 2020, which is a 35 U.S.C. 371 patent application of PCT Application No. PCT/US2017/053837, filed Sep. 27, 2017, which are herein incorporated by reference in their entirety.

BACKGROUND

In today's technological environment, it is typical for messages to be encrypted between devices. Often times, these encryption schemes utilize a centralized server or other central data store for managing encryption keys. However, using a central server for managing encryption keys can be costly and can be vulnerable to an attack. This may be of significant concern with regards to network-enabled machines or "internet of things" devices. Such machines may include autonomous vehicles, smart appliances, and climate control devices, which if hacked could do physical harm. In addition, such devices are often connected as a group, and a vulnerability present on just one device could relinquish complete control over all connected devices.

Embodiments of the invention address this and other problems, individually and collectively.

BRIEF SUMMARY

Systems and methods for secure peer-to-peer communications are described. Embodiments can share encrypted messages in a decentralized manner, such that parts (shares) of a secret are stored between peers of a network rather than maintaining the secret fully at a central location. In this manner, the peers can be configured as a secure group that cannot be compromised at a single point of attack or by a simple interception of messages.

According to embodiments, a group of devices can form a trust relationship. Each of the devices can comprise a certificate, which can be used to prove inclusion into an established peer-to-peer network of trusted devices. In addition, each server may comprise a registry, which may be a list of certificates for all other servers in the peer-to-peer network. In this manner, if a given server receives a request, it is able to check the certificate of the requestor and determine if the requestor belongs to the trusted network.

In some embodiments, devices registered into the peer to peer network may be capable of establishing a shared data encryption key (DEK). Each device may be configured to obtain a share of a data encryption key (DEKi) that can be stored locally. The shares may be shares in an M of N (e.g. Shamir's) Secret Sharing Scheme. This may involve a network that includes an integer, N, number of devices, and in which M devices may share a secret (i.e. the DEK) during communications, M being an integer less than or equal to N. To obtain the entire DEK during encryption/decryption, a requesting device may send requests to M−1 out of N devices for their shares of the DEK. Each device may check the registry of certificates to determine if the requesting device is trusted, and may then encrypt its own share using the requesting device's public key before sending to the requesting device. M−1 shares can be received by the requesting device and decrypted using the requesting device's private key. The requesting device may obtain M−1 decrypted shares and retrieve its own local share to obtain M number of DEK shares. Once M shares are obtained, they may be used generate the DEK for encrypting/decrypting a data message that is sent/received over the peer to peer network.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

TERMS

Figure 1:
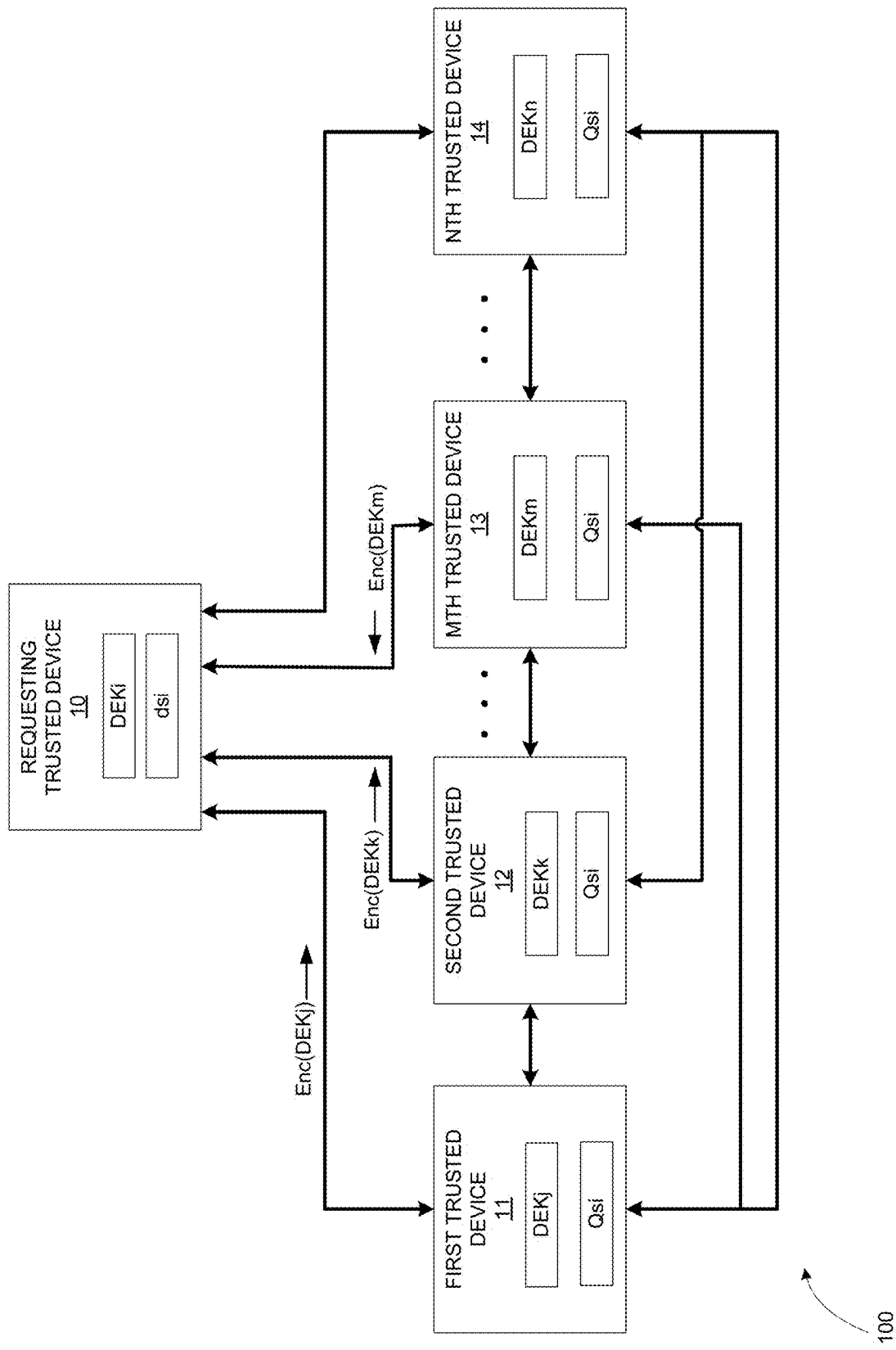
FIG. 1 shows an exemplary system according to embodiments of the invention.

The term "computing device" may refer to a device for performing computations. The computations may be used to perform a task, such as processing data and/or executing instructions. Examples of computing devices can include personal computers, servers, laptops, tablets, mobile phones, wearable device, IoT devices, etc.

The term "server" may refer to a device that services the requests of one or more client devices. Functionalities provided by a server can also be referred to as "services." As noted, a server can provide services to one or more devices over a network. For example, a server can be used to store and/or locate data according to a pre-established network protocol. A server that provides services over a network can be referred to as a "network host." A "proxy server" can refer to a server that can act as an intermediary between devices.

The term "Internet of Things" or "IT" may refer to a concept in which everyday objects can receive and exchange data. For example, typical objects such as vehicles, buildings, homes, and appliances can be fitted with electronics and network capability, such that data can be collected and/or shared while said objects are in use. An object designed and/or produced based on an IoT concept can be referred to as an "IoT device."

The term "encryption" may refer to the process of encoding information in such a way that only authorized parties can access it. This can be done to prevent the information from being read by an entity that is not authorized. An encryption process can be performed using an encryption algorithm, which may be a mathematical operation performed on data in conjunction with an encryption key, such that the data values may be altered.

A "data encryption key" or "DEK" (sometimes referred to as an "encryption key" or simply a "key") can be a value used by an encryption algorithm to encrypt data. For example, a DEK can be a string of bits. An encryption value used to encrypt and decrypt data in the same manner can be referred to as a "symmetric key." The term "data encryption key shares" or "DEK shares" can refer to values that together can be used to reconstruction a data encryption key. For example, DEK shares can be strings of bits that when combined together according to a secret sharing scheme can be used to determine another string of bits, which may be a DEK.

The term "secret sharing scheme" can refer to a method for distributing a secret amongst N participants, each of which can be referred to as a "share." In this manner, the secret can be protected even if one participant is compromised. The secret sharing scheme can be a "threshold scheme," in which a threshold number M of participants within the group of participants are required to reconstruct the secret, M less than or equal to N.

A "certificate" can refer to a credential that documents an attested fact. For example, a certificate can be a written document of ownership. A certificate can also be a digital certificate that can be processed by a computing device. For example, a digital certificate can be used to certify communications between devices in a group.

A "registry" can refer to a memory location of stored records, e.g., certificates. For example, a registry can be a collection of certificates of other devices in a trusted network. As another example, a registry can also be an allocated portion of a computer where digital records can be stored and retrieved at a later point in time.

The term "run time" may refer to a segment of time in which a computer executes a sequence of instructions that it is programmed to perform. For example, a computer can execute a routine of programs that are linked and continuously performed when the computer is supplied with power. The segment of time between when power has been turned on and when the computer begins running its programmed routines may be referred to as "boot time."

DETAILED DESCRIPTION

When exchanging encrypted data within a group of devices or servers, often times a device that needs to decrypt and access data is not the same device that encrypted the data in the first place. As such, a means for sharing an encryption key between the devices is needed. Usually encryption keys are stored at a key management server or locally in a secure element or other tamper-resistant hardware. In either case, a device that needs to access encrypted information must present credentials in order to retrieve the encryption key from where it is stored.

Embodiments described herein are directed to systems, methods, and devices for secure peer-to-peer communication. For example, embodiments describe shared key establishment for a network of N devices in which a data encryption key can be generated from shares of M of N devices in the network. In embodiments, a secure peer-to-peer network can be created between the devices, so long as the devices have established trust. Trust can be established between the N devices by generating certificates for each device, and adding each certificate to a registry. The certificates may provide proof of inclusion (i.e. registration) into the trusted peer-to-peer network, such that devices in the network may utilize the secure key establishment methods described herein. Each device may locally store its own certificate as well as its own copy of the registry comprising the certificates of the other device in the network.

Certificates for proof of registration into the network can be generated in a number of ways. In one embodiment, each certificate may be generated by a certificate authority. In another embodiment, the certificates may be generated by any device/server of the network that can present a pre-established admin password (also referred to as a user password). In embodiments, upon successful creation of the peer-to-peer network and upon successful registration of each device into the network, the devices of the network may be able to communicate amongst each other and implement further processes described herein.

In the network, data can be exchanged between devices using encrypted messages. For greater efficiency, it may be best for the devices to share the same data encryption key. However, for greater security, exposure of the data encryption key should be limited. As such, embodiments describe splitting a shared data encryption key into parts. The encryption key parts or "shares" can then be distributed amongst the devices, thereby increasing the difficulty for a hacker to intercept, copy, or regenerate the key. When a device wishes to encrypt or decrypt a message, the device may retrieve M of N shares so that the data encryption key may be generated and used to perform the necessary cryptographic operation. M−1 devices in the network may receive a request from the requesting device, and the M−1 devices may encrypt its own local share using the public key of the requesting device. Each encrypted share can be sent to the requesting device, which may receive the shares and decrypt them with its own private key. The M−1 decrypted shares along with the receiving devices' own local share can then be used to generate the data encryption key for performing the cryptographic function, thus allowing for secure communication. Further descriptions of the systems, networks, methods, and the components, installation, and uses thereof are provided below.

Embodiments provide a number of technical advantages over prior methods.

Embodiments allow for the establishment of a shared encryption key for a group of devices. According to embodiments, a group of devices can establish a trusted network, and devices can be added and removed from the trusted network. The shared encryption key that is established may allow for secure peer-to-peer communications in the trusted network in a manner that is not susceptible to injection attacks (e.g. replay attacks). Because a data encryption key is split into N shares distributed to N number of devices in a group, it requires an attacker to hack into multiple devices in order to intercept the encryption key, which is highly improbable. Furthermore, the shares may be generated such that they are not stored in memory for an extended period of time, further limiting the opportunities for compromise by an attacker. Additionally, the shares may be retrieved in a secure manner at boot time of a device without requiring a user to manually enter a password. Accordingly, embodiments can be well-suited for encrypted communications in which encrypting devices may vary from decrypting devices. For example, embodiments are well-suited for proxy servers and IoT devices.

I. Example Network of Trusted Devices

An example system includes N devices. The devices may be connected via network interfaces that allow for the exchange of data. For example, the devices may each comprise network interfaces for connecting over a wired and/or wireless communications network, such as through Ethernet, cellular telecommunications, Bluetooth, WiFi, and/or any other form of electromagnetic signaling, such as radio signaling, optical signaling, microwave relay, etc. As examples, the devices may be servers on a network, collectively providing a website or as smart devices of a home.

FIG. 1 shows an exemplary network 100 according to embodiments of the invention. FIG. 1 shows a plurality of devices of a peer-to-peer network, such as first trusted device 11, second trusted device 12, requesting trusted device 10, Mth trusted device 13, Nth trusted device 14, etc. According to embodiments, any number of devices (e.g. ranging from a quantity of 2 to N devices) may be connected in the network via one or more network interfaces of each device. The devices of the network may further establish a trust relationship with one another via a registration into the network, as described further below.

Each of the devices shown in FIG. 1 (e.g. requesting trusted device 10, Mth trusted device 13, Nth trusted device 14, etc.) may also be referred to as a computing device or computer system. A computing device can include a processor, as well as memory, input devices, and output devices, each operatively coupled to the processor. A computing device may be capable of communicating with other devices, computers, or systems over a suitable communications network. Exemplary computing devices may include cellular or mobile phones, tablet computers, desktop computers, laptops, personal digital assistants (PDAs), pagers, servers, server computers, and the like. Other examples include wearable devices, such as smart watches, eyewear, fitness bands, rings, etc. Further examples can include everyday objects fitted with the computing components described above, such as any number of devices/products designed and/or manufactured according to an internet of things (IoT) concept. This may include, but may not be limited to, buildings, mirrors, televisions, self-driving cars, home entertainment systems, home appliances, and/or climate control devices. In some embodiments, the computing device may include any machine, vehicle, or appliance with processing, memory storage, and remote communication capabilities.

According to embodiments, a secret can be shared between the devices of network 100. For example, the shared secret can be a long string of characters or a very large number that may be difficult to guess. For securely exchanging data between the devices, the shared secret can be used as a data encryption key (DEK). Thus, the devices of network 100 can encrypt and decrypt data messages amongst each other, whilst any device outside of the network may be unable to read the data without the shared secret (i.e. without the DEK). Furthermore, to prevent the DEK from being stolen from any one device, the data encryption key may be split into parts, referred to as key shares or DEK shares. The key shares can be distributed amongst the devices and accumulated later by a device that wishes to perform a cryptographic operation. The DEK may be split such that it may be computationally difficult to regenerate the full DEK without at least a predetermined threshold number of shares. This may add additional security to the network, as the probability of an attacker obtaining the necessary amount of shares may be low.

In embodiments, a requesting trusted device 10 may request data encryption key shares from the other trusted computing devices of the network, for generating the DEK. M shares may be required for generating the DEK, such that the DEK can be obtained and used to perform the desired cryptographic operation (encryption or decryption). Requesting trusted device 10 may request DEK shares from M−1 trusted devices, which may be stored locally on each device according to the processes described further below. For example, requesting device may request shares DEKj, DEKk, and DEKm from first trusted device 11, second trusted device 12, and Mth trusted device respectively. Each device for which a local DEK share is requested may encrypt its local DEK share using the public key, Qsi, of the requesting device 10. The encrypted shares can be collected by requesting trusted device 10 and decrypted using the private key, dsi, of requesting trusted device 10. The decrypted shares and requesting trusted device 10's local DEK share (i.e. DEKi) can be used to generate the DEK per an M of N secret sharing (i.e. threshold) scheme, and the DEK can be used to perform the necessary cryptographic function. In embodiments, the DEK may be a symmetric key, such that a message encrypted using the DEK can be decrypted using the same DEK, and in virtually the same manner.

II. Data Encryption Key (DEK)

According to embodiments, a data encryption key (DEK) can be shared and utilized for encrypting/decrypting data messages between devices. Some embodiments are directed to establishing a DEK from shares generated from the DEK. The methods described herein may be implemented by computing devices in a network of N computing devices, such as network 100 of FIG. 1. In embodiments, the methods may provide secure communications between the computing devices in a peer to peer manner.

A. Example Use Case for a DEK

There may be numerous uses for an established shared data encryption key, any of which may involve securely processing data amongst a group of devices, such as the devices shown in FIG. 1. In one example, the trusted computed devices of FIG. 1 can be a trusted group of servers within a larger network. For example, the larger network may be the Internet, and the trust computed devices can be a group of trusted proxy servers for accessing a particular web application. The web application can be, for example, an application that provides computing resources, a social media account, an email application, payment processing services, or an application that provides some other third party service to a client device. As such, requesting trusted device 10 of FIG. 1 may be a proxy server that authenticates to a web server on behalf of the client device, such that the client device may access the provided services.

Furthermore, in this example, access to the web application may require a password or other credential registered to the user. The proxy server, requesting trusted device 10, may then retrieve information from other trusted devices in the trusted network to retrieve and decrypt the required password. As such, any of the proxy servers in the group may be capable of decrypting the required password and accessing the web application, so long as the proxy server can regenerate the DEK from shares of the other servers in the network.

Figure 2:
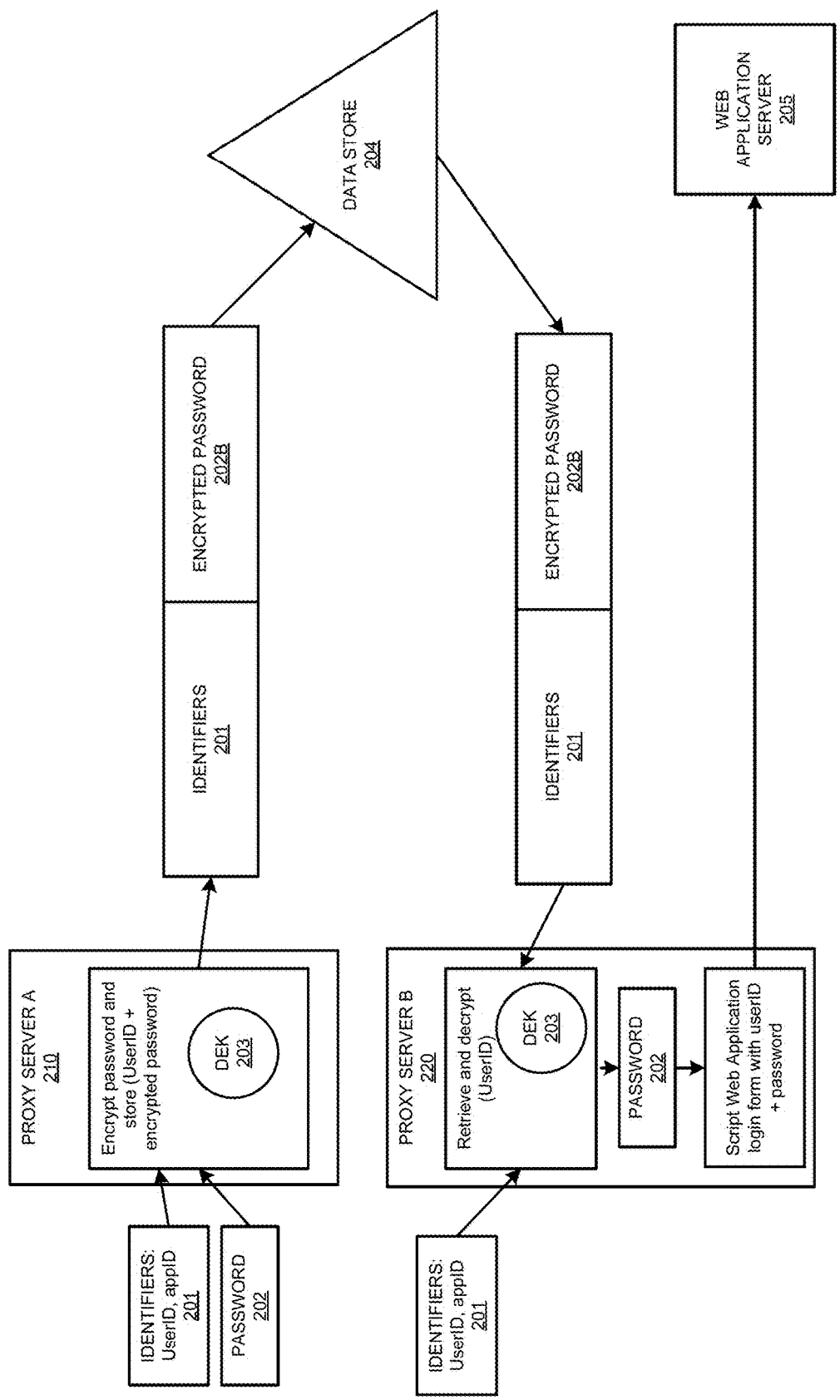
FIG. 2 shows a process flow diagram of an example use case for a data encryption key according to an embodiment.

FIG. 2 shows a process flow diagram of an example use case for a data encryption key according to an embodiment. In the example shown, process 200 may comprise proxy server A 210 and proxy server B 220, which may both be servers of a trusted network, such as network 100 of FIG. 1. Proxy A 210 and proxy server B 220 may be separate and different servers that perform similar functions and act as proxy servers for accessing a web application. Use of the web application may require authentication to web application server 205 via a registered password that may be linked to identifiers 201, e.g. an identifier for a requesting user (i.e. userID) and an identifier for the web application (i.e. appID).

For accessing the web application, it may be desired for the user to provide the password only once during registration, initially to a first proxy server, such as proxy server A 210. The password may then be encrypted by proxy server A using an established data encryption key. The data encryption key may be a shared key, such that each server in a group of proxy servers may have access to the key. In embodiments, when a user establishes a password during registration, the password may be immediately encrypted by proxy server A 210 using the established data encryption key, DEK 203. For example, an Advanced Encryption Standard Key Wrap (AESKW) may be performed, in which password 202 is encrypted using DEK 203 to obtain an encrypted password 202B. Encrypted password 202B may then be linked to identifiers 201 to associate the encrypted password 202B to the user and to the web application. Encrypted password 202B and associated identifiers 201 may then be stored at data store 204 for later use. Data store can be any storage of encrypted data. In one embodiment, data store 204 can be a remote database, such as a separate relational database. In another embodiment, data store 204 can be a memory storage of a device in the trusted network.

At a later time, a different server (proxy server B 220) within a trusted network of proxy servers may be contacted by the client device when the user wishes to access the web server. For example, to provide the user with the web service in the most efficient manner, the user may be routed to a server that is the least busy or has less of a bottleneck. The contacted server, proxy server B 220, may retrieve the password from data store 204, and may decrypt the password using the established data encryption key. As described in the description herein, an established data encryption key can be split into shares, and can be regenerated by retrieving the shares when it is time to perform a decryption (or encryption). As such, the proxy server B 220 may retrieve data encryption key shares, and decrypt the encrypted password, 202B. The decrypted password may then be sent by proxy server B 220 to web application server 205, so that the user can be authenticated and granted access to the web application.

According to embodiments described herein, a method for securely establishing a shared DEK between trusted devices can be implemented. In embodiments, a DEK for a network of N trusted servers/devices may be split into N shares, and may be regenerated from M of N shares. That is, the data encryption key 203 for encrypting and decrypting the password may be shared in a distributed manner amongst M devices in the network of N trusted devices, such that the DEK may not be stored in its entirety in a central location. This may be done so as to prevent against "replay attacks" in which sharing of the entire DEK in a valid transmission may be intercepted and used to obtain the authentication password.

B. Method for Establishing a Data Encryption Key

Figure 3:
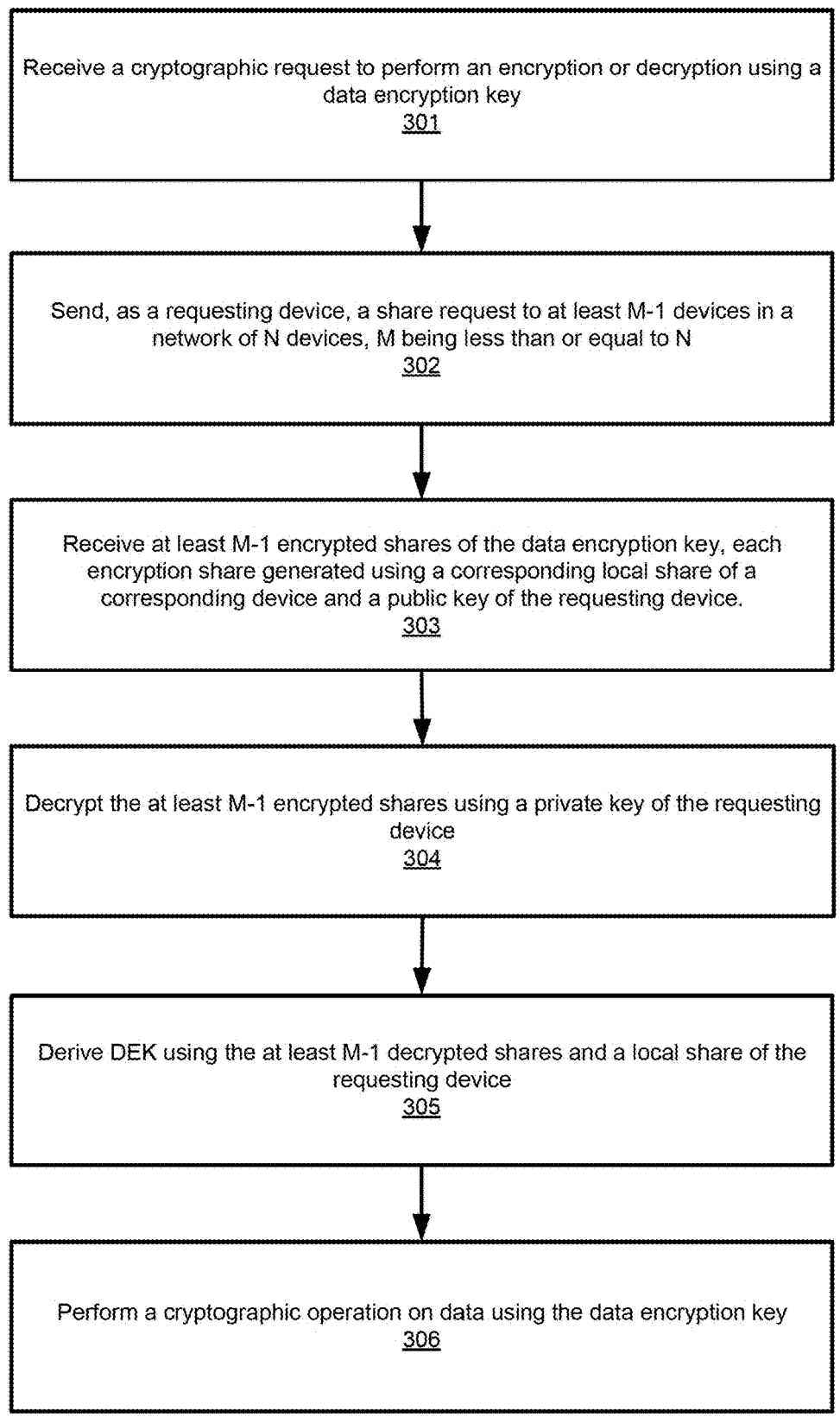
FIG. 3 shows a flowchart for a method according to embodiments of the invention.

FIG. 3 shows a flowchart for a method according to embodiments of the invention. The method may be directed to establishing a data encryption key that can be split into parts and shared between devices in a trust network. In one embodiment, the method can be implemented by devices in network 100 of FIG. 1. For example, the method may describe requesting trusted device 10 of FIG. 1 requesting key parts or shares from other devices in network 100. The shares may be requested via share requests, and each share request may be received by each device. M−1 devices in a trusted network may receive a share request so that M−1 DEK shares can be obtained by the requesting device. For example, $DEK_j$, $DEK_k$, and $DEK_m$ may be retrieved and obtained from first trusted device 11, second trusted device 12, and mth trusted device 13 of FIG. 1 respectively. The M−1 obtained shares can be decrypted and, along with a local share of requesting trusted device 10 (i.e. $DEK_i$ of FIG. 1), may result in M of N shares for generating a data encryption key (DEK). The DEK can then be used to encrypt/decrypt that is shared between the devices, such as a web application password or other private data. For example, the DEK can be DEK 203 used in process 200 of FIG. 2.

At step 301, a cryptographic request to perform an encryption or decryption using a data encryption key is received. In one embodiment, the cryptographic request may be initiated by a user and/or client device. For example, a user may input a command to log into a service from his or her mobile phone, which may initiate a request to encrypt login credentials before submission. As another example, the computing device may be an internet of things (IoT) device, such as an autonomous vehicle or home appliance, and the cryptographic request may be generated by a first IoT device so that it may share private data with a second IoT device. For example, the private data may be a location of the first IoT device or may be payment credentials that second IoT device can use to make a purchase. In embodiments, the cryptographic request may be received and processed by a processor of a computing device, and the computing device may then act as a requesting device for requesting data encryption key shares.

At step 302, a share request to at least M−1 devices in the network is sent by the requesting device. According to embodiments, a DEK may exist as shares stores at multiple devices, and a threshold number of shares may be required for reproducing the full DEK. In embodiments, M of N shares may be required for deriving the shared data encryption key in a trusted network of N devices. M may be an integer less than or equal to 1, which can include the local share of the requesting device. In embodiments, the DEK shares may be shares according to an M of N secret sharing/threshold scheme, such as Shamir's secret sharing. More information regarding M of N secret sharing can be found in Adi Shamir, How to share a secret, Communications of the ACM, v. 22 n. 11, p. 612-613, November 1979 [doi>10.1145/359168.359176], which is incorporate by reference in its entirety.

At step 303, at least M−1 encrypted shares of the data encryption key is received by the requesting device from the M−1 devices. In one embodiment, each of the M−1 devices may retrieve a locally stored DEK share and may encrypt the DEK share using the public key of the requesting device. In one embodiment, each of the M−1 devices may reference a local registry to determine if the requesting device is included in the trusted network. In one embodiment, the local registry may comprise the certificates of every computing device registered into the trusted network, i.e. N certificates for N devices. In another embodiment, the registry of certificates may not be stored on the devices but be located in an online repository shared by the devices. Individual certificates maybe obtained upon request, e.g., using a lightweight directory access protocol (LDAP) query. Thus, each of the N devices can be communicably coupled to a registry of certificates that correspond to devices that belong to the trusted network, thereby enabling any one of the N devices to authenticate another device as being in the trusted network.

At step 304, the requesting device receives and decrypts the at least M−1 encrypted shares using a private key of the requesting device. The private key may be retrieved from a local memory of the requesting device and then used to derive encryption keys needed to decrypt each of the at least M−1 encrypted shares. For example, a Diffie-Hellman or other suitable asymmetric encryption method can be used as further described below. In one embodiment, the local memory may be a secure element of the requesting device.

At step 305, the requesting device generates the data encryption key (DEK) from at least M−1 decrypted data encryption key shares and a local share of the requesting device. In one embodiment, at least M−1 encrypted shares received from M−1 devices and may be decrypted using a local private key of the requesting device. In one embodiment, the decrypted at least M−1 shares and local share of the requesting device may be combined according to a threshold scheme, in which any M number of parts/shares may be sufficient to reconstruct the original DEK, M being an integer less than or equal to N.

At step 306, a cryptographic operation on data is performed using the data encryption key. In embodiments, the DEK may be a symmetric key, such that the DEK used for encrypting a message in the trusted peer-to-peer network may be identical to the DEK used to decrypt the message. For example, the DEK may be used by a first device to encrypt private data of a user, and similarly, may be used by a second device to decrypt the private data at a later point in time. The private data may be, for example, a password, such as in the case of process 200 of FIG. 2. Thus, a message encrypted in the network can be decrypted by any device in the network, so long as the device is certified and has registered trust. As such, embodiments provide a method for establishing a shared data encryption key between M of N devices, and thus enabling secure peer-to-peer communications in a trusted network of N devices.

III. Trust Establishment

According to embodiments, secure implementation of a shared data encryption key may require an establishment of trust amongst devices in a peer-to-peer network. The trust relationship between the devices in the network may be provided through the use of certificates, which may be maintained in a registry. In embodiments, each trusted device may store a local copy of the registry and can reference the registry when verifying the certificates of other devices.

Figure 4:
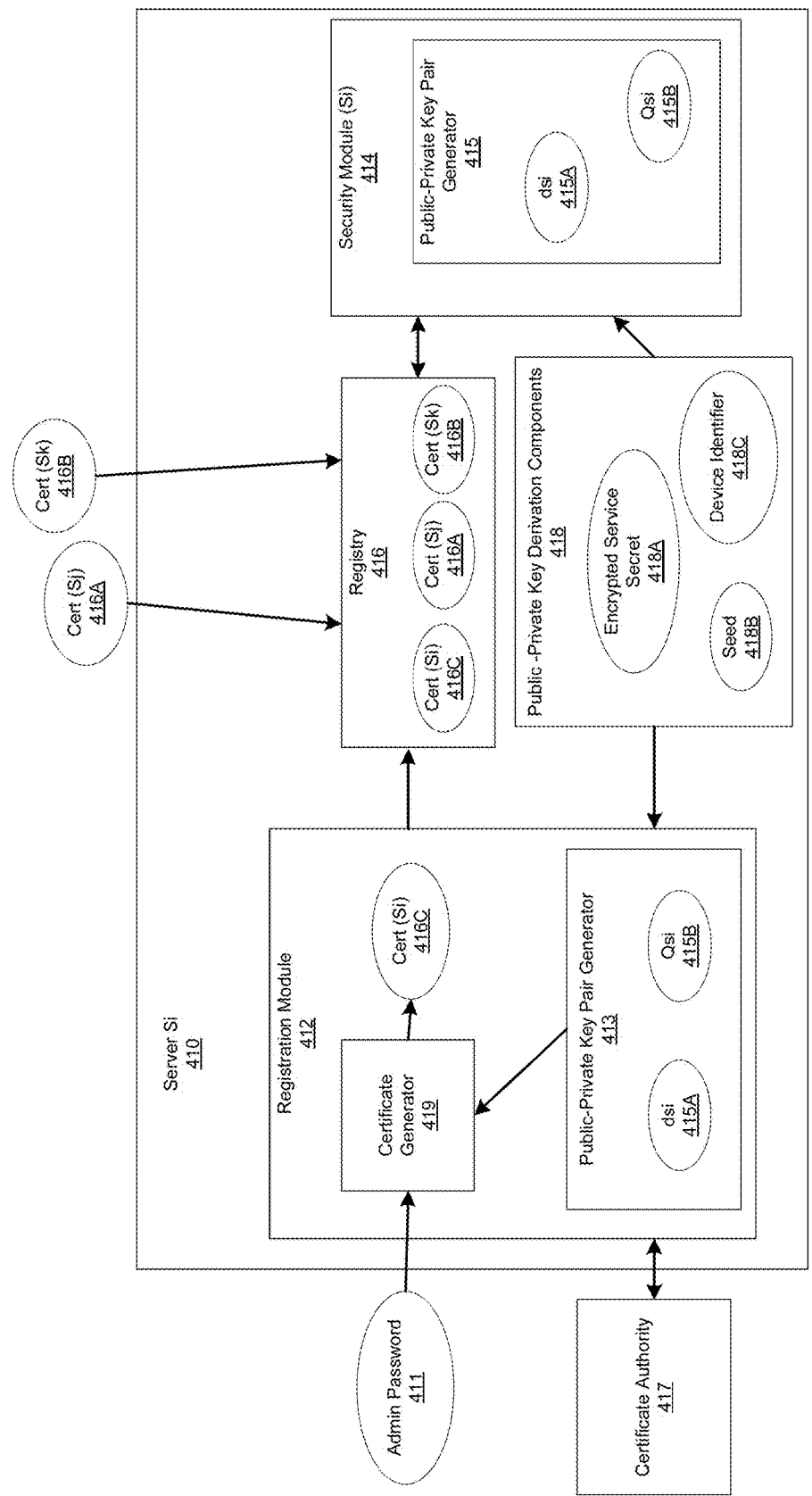
FIG. 4 shows a block diagram for registration of a computing device into a trusted network according to an embodiment.

FIG. 4 shows a block diagram 400 for registration of a computing device into a trusted network according to an embodiment. As explained above, an initial step of registration may be to set up a trust relationship between devices. The process shown may be for including a server, server Si 410, into said trust relationship. As examples, server Si 410 may be any one of first trusted device 12, requesting trusted device 10, Mth trusted device 13, and/or Nth trusted device 14 of FIG. 1.

A. Registration Module

Server Si 410 may comprise registration module 412 for performing a registration process. Registration module 412 may be an executable stack of code comprising instructions for generating one or more encryption keys during registration, producing a certificate, and for storing certificates in registry 416. For example, registration module 412 may comprise public-private key pair generator 413 for performing one or more key derivation processes to generate a public key, Qsi 415B, and private key, dsi 415A. In embodiments, dsi 415A can be generated from public-private key derivation components 418, as described further below. Qsi 415B can then be derived from dsi 415A.

In embodiments, public-private key derivation components 418 may be one or more data elements for deriving a private key, dsi 415A, and public key, Qsi 415B, for server Si 410. In one embodiment, public-private key derivation components 418 may comprise one or more of: an encrypted service secret 418A, a seed 418B, and device identifier 418C. The seed 418B may be a random number generated by an operating system of server Si 410. The device identifier 418C may be any identifier for server Si 410, such as an IP address, media access control (MAC) address, etc. The encrypted service secret 418A may be a secret of server Si 410, such as a secret string of characters that may be hidden in code of registration module 412 and that may allow for the generation of a private key, dsi 415A, and public key, Qsi 415A.

Registration module 412 may also comprise a certificate generator 419 for generating a certificate (e.g. Cert (Si) 416C) for one or more computing devices in a trusted network. In one embodiment, an admin password 411 (or any user password) may be established for the trusted network, and a certificate (e.g. Cert (Si) 416C, Cert (Sj) 416A, Cert (Sk) 416B) may be generated by any computing device that comprises the admin password 411. In one embodiment, the admin password 411 may be a one-time use password that may only be valid during registration of one or more devices into the trusted network.

In another embodiment, a certificate authority (CA) 417 may be used to issue digital certificates for each computing device in the trusted network. For example, a certificate request may be sent to a remote server that generates a certificate for server Si 410 based on public-private key derivation components 418. In one embodiment, obtaining a certificate, Cert (Si) 416C for a server Si 410, may comprise generating, by server Si 410, a certificate request 417, sending the certificate request 417 to a server capable of generating a digital certificate, and receiving the certificate, Cert (Si) from the server capable of generating the digital certificate. In one embodiment, the certificate request may be signed by server Si 410 using private key dsi 415A according to a digital signature algorithm. In another embodiment, a digital signature appended to the certificate request may be verified using the public key, Qsi 415B, of server Si 410.

B. Registry

As explained above, a server Si 410 that comprises a private key dsi 415A and public key Qsi may request and/or generate a certificate. According to embodiments, instructions of registration module 412 may be used to generate, encrypt, and/or store certificates in registry 416. In one embodiment, the contents of registry 416 may be encrypted.

In one embodiment, each certificate of registry 416 (e.g. Cert (Si) 515C. Cert (Sj) 515A, Cert (Sk) 515B) may be encrypted using public key Qsi 415B and/or components thereof. For example, an AES CMAC algorithm and/or PKCS #5 encryption standard can be used.

After successful registration, private key dsi 415A and public key Qsi 415B may be erased from registration module 412. In embodiments, server Si 410 may reproduce the private key dsi 415A and public key Qsi 415B during boot time using code of security module (Si) 414. In embodiments, security module (Si) 414 may comprise code for performing cryptographic functions and may comprise public-private key pair generator 415 for reproducing public key Qsi 415B and private key dsi 415A.

In one embodiment, the private key dsi 415A and public key Qsi 415B may be erased from memory after each time server Si 410 shuts down and may be reproduced each time server Si 410 reboots. For example, when a shutdown process is initiated, a processor of server Si 410 may replace, in memory, data for the private key dsi 415A and public key Qsi 415 with random data before cutting off power to the memory, processor, and other hardware components. Furthermore, security module (Si) 414 can be used to establish a data encryption key. Additionally, security module (Si) 414 may further comprise code for accessing the contents of registry 416, which may be needed for DEK establishment according to embodiments.

IV. Establishing Data Encryption Key

As explained above, a data encryption key can be established for trusted devices in a network. This may be done so that the trusted devices can securely share data through cryptographic operations performed on data. For example, the trusted devices can be a group of trusted servers for providing a service and/or accessing a service on behalf of users. As another example, the trusted devices may be a group of IoT devices that belong to and are registered to a user or group of users. According to embodiments, the DEK may be stored as parts, referred to as DEK shares, which may be distributed at each device in a group of trusted devices, and may be collected by a requesting device to perform the necessary cryptographic operation on data. The DEK may first be created by a DEK generation server and then split into DEK shares as explained below.

A. Generating DEK Shares

Figure 5:
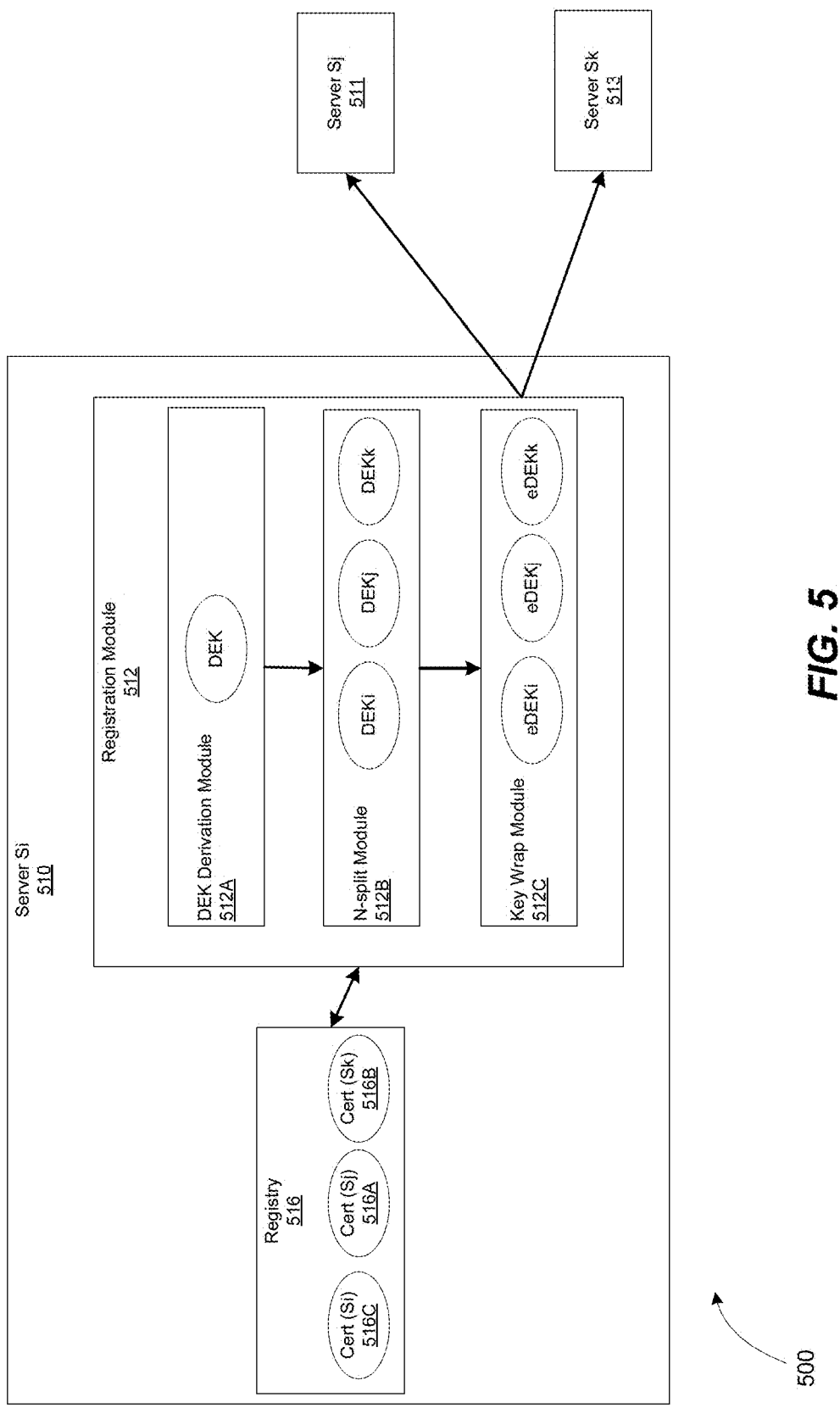
FIG. 5 shows a diagram for generating data encryption key shares according to an embodiment.

FIG. 5 shows a diagram for generating data encryption key shares according to an embodiment. In embodiments, a server Si 510 of a trusted peer-to-peer network may serve as a DEK generation server for creating a data encryption key (DEK) and splitting the DEK into DEK shares. In one embodiment, server Si 510 may be server Si 410 of FIG. 4. The server Si 510 may generate DEK shares for storing at other servers in the network, such as server Sj 511, and server Sk 513. In one embodiment, server Si 510, server Sj 511, and server Sk may be requesting trusted device 10, first trusted device 11, and second trusted device 12 of FIG. 1 respectively. In yet another embodiment, server Si 510 may be proxy server A 210, and server Sj 511 or server Sk 512 may be proxy server B 220 of FIG. 2. In various embodiments, the DEK may be a symmetric key and may also be a limited-use key (LUK) for which its usage may be constrained. For example, the DEK may be limited to a specific number of uses and/or limited to a predetermined duration of valid use.

As explained previously, a server Si 510 may comprise a registry 516 and a registration module 510. The registry 516 may comprise a plurality of certificates for a plurality of devices in the trusted network (e.g. Cert (Si) 516C, Cert (Sj) 516A, Cert (Sk) 516B, etc.). The registration module 512 may comprise one or more submodules of code that may be used to establish a DEK, such as DEK derivation module 512A, N-split Module 512B, and key wrap module 512C.

To establish a data encryption key (DEK) for a peer to peer network of trusted servers, DEK derivation module 512A may be used to create the DEK. After this initial creation of the DEK, N-split module 512B may then be used to split the DEK into N number of data encryption key shares (e.g. DEKi, DEKJ, DEKk, etc.) for N number of devices in the network. For example, the DEK may be expressed as a very large integer or string of characters, and the DEK may then be split according to a threshold scheme, in which determining the DEK may be computationally difficult without M of N number of shares, with M being an integer less than or equal to N. In one embodiment, the threshold scheme may be Shamir's secret-sharing scheme. Upon creation of N DEK shares, the DEK created on server Si 510 may be destroyed, such that the DEK can only be reproduced by obtaining M-of-N DEK shares.

In embodiments, each data encryption key (DEK) share may be encrypted using instructions of key wrap module 512C. In one embodiment, each DEK share may be encrypted using the public key of its corresponding server. For example, an AES key wrap algorithm or other wrapping technique can be used, such as elliptic curve Diffie-hellman (ECDH). Upon encrypting each DEK share (e.g. DEKi, DEKj, DEKk, etc.) using a public key of each corresponding device (i.e. public keys of server Si 510, server Sj 511, and server Sk 513), key wrap module 512C may yield encrypted DEK shares eDEKi, eDEKj, and eDEKk. The encrypted share may then be sent to and/or stored at server Si 510, server Sj 511, server Sk 513.

In some embodiments, information relating to the public keys and the network addresses of the N servers/devices in the network may be obtained/determined from registry 516. At a later point in time, a requesting server may request M−1 shares from M−1 servers in the network (e.g. from server Sj 511 and server Sk 513). Each of the M−1 servers may then retrieve and decrypt its locally-stored encrypted DEK share using its local private key, as the encrypted DEK share was encrypted with that device's public key. The requested M−1 shares may be re-encrypted by the M−1 servers using the requesting server's public key, and may be sent to the requesting server for use in generating a shared DEK and performing a cryptographic operation on data.

B. Regenerating DEK from shares

Once each of the servers store key shares, one of the servers can request key shares from the other devices so as to re-generate the DEK. The DEK can be used to encrypt data and to securely share the data with other trusted servers in the network, or can be used to decrypt data encrypted by the other trusted servers. A process for regenerating the DEK is described here in this section.

Figure 6:
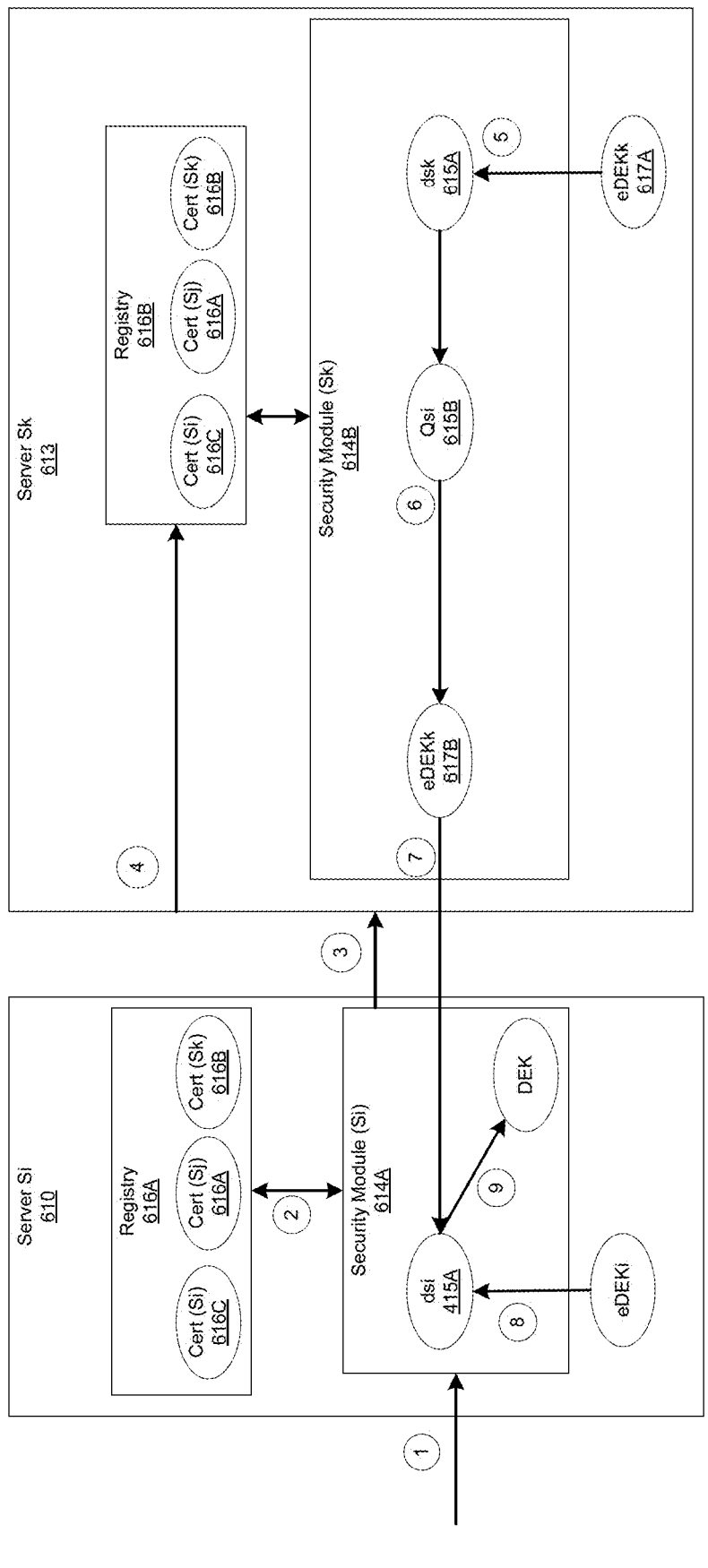
FIG. 6 shows a process flow diagram for deriving a data encryption key from shares according to an embodiment.

FIG. 6 shows a diagram for deriving a data encryption key from shares stored at computing devices according to an embodiment. Diagram 600 shows communications between a requesting server Si 610 and one or more servers Sk 613 of a trusted network. Server Si 610 may be, for example, requesting trusted device 10 of FIG. 1 and the one or more servers Sk 613 may be first trusted device 11, second trusted device, and/or Mth trusted device 13 of FIG. 1. As another example, server Si 610 and server Sk 613 may be proxy server B 220 and proxy server A 210 of FIG. 2 respectively.

According to embodiments, a trusted network may comprise any number, N, computing devices (e.g. servers). At boot time, a requesting server Si 610 of the trusted network may require M number of DEK shares to generate a DEK for performing a cryptographic operation on data in the network. The M number of DEK shares may include a local encrypted DEK share, eDEKi, that can be decrypted on server Si 610, as well as M−1 DEK shares retrieved from M−1 computing devices in the network. M being a number less than or equal to N. To perform the cryptographic function, steps 1 through 9 may be performed. The cryptographic operation can include the encryption or decryption of any data sent from or received by Server Si 610. The data may be data that can be shared with another device in the network, i.e. server Sk 613. Examples of shareable data may be an encrypted password or encrypted data of a user, such as user payment information, user location data, user device settings, or other personal information that can be shared between N trusted devices. In one embodiment, the trusted devices can be user IoT devices or IoT devices for a group of trusted users.

At step 1, the server Si 610 receives a cryptographic request. The cryptographic request may be initiated by an application of a device that wishes to communicate with another computing device in the peer-to-peer network. For example, the application may be a payment application for processing transactions or may be any other application for performing one or more services, such as a transportation service, delivery service, printing service, media streaming service, file sharing service, etc. The application may generate the cryptographic request as part of a transmission of application data, such that the application data can be exchanged securely. For example, the application data may be data necessary for carrying out a payment transaction or other service. The application may then send the cryptographic request to a processor of server Si 610, such that server Si 610 may initiate the requested cryptographic operation on the application data. As another example, the application may be an application of an IoT device, and the application data may be data required for completing an action or given task.

At step 2, the server Si 610 determines the location of M of N shares of the data encryption key (DEK), e.g., by identifying M devices for requesting the shares. In one embodiment, server Si 610 may utilize information of registry 616A to determine the location of M number of DEK shares. For example, registry 616A may comprise certificates of at least M number of devices in the network, as well as the associated network addresses of the M devices. Server Si 610 may then use the associated network addresses to generate one or more share requests directed at the M devices.

At step 3, the server Si 610 sends a share request to M−1 trusted computing devices for M−1 DEK shares. Each share request sent to the M−1 computing devices may comprise a certificate of the requesting server Si 610. In embodiments, M may be any number less than or equal to N, such that a DEK may be computationally difficult to determine without M number of shares. For example, for the peer-to-peer network of system 100 of FIG. 1, the M computing devices may include first trusted device 11, second trusted device 12, and Mth trusted device 13, as well as requesting trusted device 10. It should be understood that although diagram 600 shows a single server for M−1 servers Sk 613, M−1 servers Sk 613 may comprise any number of servers in a trusted network of N servers, so long as M is less than or equal to N.

At step 4, each of the M−1 servers Sk 613 receives the share request and verifies that the server Si 610 belongs to the trusted network. For example, server Sk 613 may compare a certificate, Cert (Si) 616C, of server Si 610 and any digital signatures appended to the Cert (Si) 616C to one or more certificates stored in a local registry 616B. If Cert (Si) 616C matches a certificate stored in the local registry 616B, and if the digital signatures can be verified, then server Sk 613 may determine that server Si 610 belongs to the trusted network. Thus, server Si 610 may be validated, and its inclusion into the trusted network verified, by each of the M−1 servers Sk 613 before receiving the necessary DEK shares.

At step 5, each of the M−1 servers Sk 613 retrieves and decrypts its local encrypted DEK share. As explained in the previous section above, each local encrypted DEK share may have been encrypted by a DEK generation using the corresponding device's public key and can be decrypted using the local private key for that device. In embodiments, upon verification of server Si 610's inclusion into the trusted network, each of the M−1 servers Sk 613 may then proceed to retrieve its local encrypted share, eDEkk 617A. Each server Sk 613 may then decrypt eDekk 617A using its local private key, dsk 615A. In one embodiment, the decrypted DEK share, DEKk, may be stored in non-persistent memory during use, and may be destroyed/erased from memory immediately after step 6 has been performed.

At step 6, each of the M−1 servers Sk 613 re-encrypts its local decrypted DEK share using the public key, Qsi 615B, of the requesting server, Si 610. In one embodiment, the public key, Qsi 615B may be obtained from registry 616B. For example, Qsi 615B may be associated with Cert (Si) in a relational table of registry 616B. Once retrieved, the public key of requesting server Si 610 may be used by server Sk 613 to re-encrypt the local DEK share to yield re-encrypted share eDEKk 617B. In some embodiments, the encryption can use Diffie-Hellman encryption, and thus can use Qsi 615B and dsk 615A to generate a shared secret, which can be used to generate an encryption key. Examples of such encryption techniques are described in U.S. patents application Ser. Nos. 14/595,792, 62/016,048, 14/168,309, and 15/629,689, which are herein incorporated by reference in their entirety for all purposes.

At step 7, each of the M−1 servers Sk 613 sends its local re-encrypted share, eDekk 617B, to the requesting server Si 610. Server Si 610 may then receive the M−1 encrypted shares eDekk 617 from the M−1 servers. According to embodiments, M number of DEK shares may be required to derive the complete data encryption key (DEK), which may include the M−1 data encryption key shares received from the M−1 servers 613 and the local share, DEKi, of server Si 610.

At step 8, the requesting server Si 610 receives M data encryption key shares and decrypts the M shares using its local private key, dsi 415A. As previously explained, the M shares may include the local data encryption key share, DEKi, of server Si 610, and the M−1 shares retrieved from the M−1 servers Sk 613. Server Si 610 may retrieve its local encrypted share, eDEKi from memory, receive the M−1 shares over the trusted network, and may then decrypt the M shares. The decrypted key values may be stored in non-persistent memory where they can be erased from memory after use (i.e. after the DEK has been derived from the DEK shares).

At step 9, the requesting server Si 610 may generate the DEK using the M DEK shares. In one embodiment, the DEK may be generated from the M DEK shares according to Shamir's secret-sharing scheme. For example, the DEK may be a string of characters or a very large number, which can be expressed as an unknown term of a polynomial, and each of the DEK share values may represent random numbers that may serve as coefficients for other terms of the polynomial. The requesting server Si 610 may then be configured to reconstruct the polynomial from M shares to determine the DEK, such as through interpolation or other suitable method. In one embodiment, further authentication steps may be performed/may be required before generation of the DEK. For example, server Sk 610 may configured to check the location, status, authentication state, and/or system parameters of one or more computing devices in the trusted network to verify that the one or more computing devices in the network have not been compromised.

Once the DEK has been generated from the DEK shares, the DEK may be used to perform a cryptographic operation (i.e. encryption/decryption) on data that is communicated in the trusted network. For example, the DEK may be a symmetric key capable of encrypting and decrypting data shared between server Si 610 and server Sk 613. In one embodiment, the DEK and shares thereof may only exist in non-persistent memory and may be destroyed, cleared, and/or dumped from memory immediately after use (e.g. immediately after performing the cryptographic operation). In another embodiment, the DEK may be cached on one or more computing devices of the trusted network until the one or more computing devices shuts down.

V. Device Architecture

Figure 7:
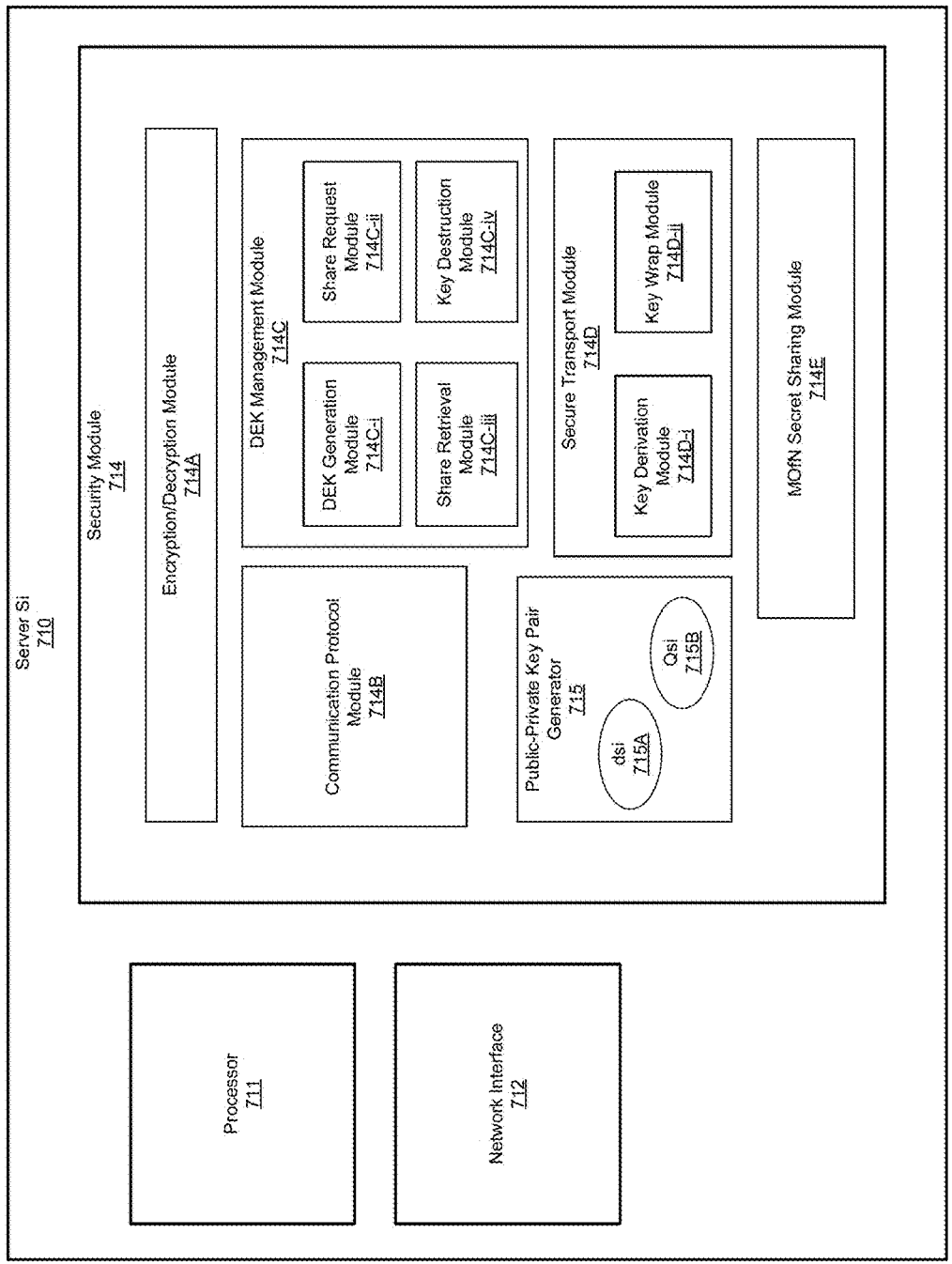
FIG. 7 shows a block diagram of an exemplary computing device according to an embodiment.

FIG. 7 shows a block diagram of an exemplary computing device according to an embodiment. Server Si 710 may comprise a processor 711 for executing instructions, a network interface 712 for sending and receiving messages over a communication network, and one or modules and/or sub-modules of code comprising instructions executable by processor 711. Security module 714 may comprise a plurality of sub-modules, such as encryption/decryption module 714A, communication protocol module 714B, DEK management module 714C, secure transport module, MofN Secret Sharing Module 714E, and public-private key pair generator 715.

Encryption/decryption module 714A may comprise code for performing a cryptographic operation on data. For example, encryption/decryption module 714A may comprise instructions for using an encryption algorithm in conjunction with a symmetric key to encrypt/decrypt data that may be included in a message. In embodiments, the symmetric key may be a DEK established between trusted devices in a peer-to-peer network.

Communication protocol module 714B may comprise code for communicating messages according to a pre-established communication protocol. For example, communication protocol module 714B may comprise code for generating, sending, receiving, and formatting request messages and response messages according to a Hypertext Transfer Protocol (HTTP). In one embodiment, communication protocol module 714B may further comprise instructions for performing an authentication scheme, such as a challenge-response mechanism (e.g. basic access authentication, digest access authentication, etc.).

DEK management module 714C may comprise code for generating, destroying, and/or obtaining a data encryption key and shares thereof. In an embodiment, DEK management module 714C may comprise a plurality of sub-modules such as DEK generation module 714C-i, share request module 714C-ii, 714C-iii, and 714C-iv. DEK generation module 714C-i may comprise code for generating a data encryption key. According to embodiments, a data encryption key may be generated from M of N data encryption key shares. Share request module 714C-ii may comprise code for requesting one or more DEK shares. For example, at boot time, server 710 may generate a share request as an array. The array may comprise one or more share identifiers (e.g. represented as a uniform resource locator i.e. URL), one or more server identifiers for one or more servers from which shares are to be retrieved from, an application identifier, a DEK identifier, and one or more share identifiers. For example, the array may have form: {URL, Server_ID, APP_ID, DEK_ID, Share_ID). Share retrieval module 714C-iii may comprise code for obtaining one or more DEK shares. For example, share retrieval module 714C-iii may comprise instructions for waiting/checking for a response from M−1 computing devices. Key destruction module 714C-iv may comprise code for destroying one or more encryption keys and/or shares thereof. For example, key destruction module 714C-iv may comprise instructions for removing transient representations of a local private key, dsi, and of a shared DEK from memory upon the termination of a communication session (e.g. upon shutdown of a computing device in the network).

Secure transport module 714D may comprise code for one or more cryptographic algorithms. For example, secure transport module may comprise instructions for performing key derivation functions, hash functions, key wrap functions, etc. In one embodiment, instructions for deriving a key may be stored in key derivation module 714D-i. In another embodiment, instructions for encrypting/wrapping a key may be stored in key wrap module 714D-ii. Examples of specific cryptographic algorithms may include PBKDF2( ), AESKW( ), and any number of perfect forward secrecy algorithms (PFSs).

MOfN secret sharing module 714E may comprise code for performing calculations according to an MofN secret sharing scheme. For example, MOfN secret sharing module 714E may comprise code for splitting a DEK into N shares, as well as instructions for reconstructing a DEK from M of N DEK shares, M being an integer less than or equal to N. In embodiments, the secret sharing scheme may be a Shamir's secret sharing algorithm.

Public-private key pair generator 715 may comprise code for generating a public-private key pair. In embodiments, at boot time of server Si 710, executable instructions of public-private key pair generator 715 may instruct processor 711 to generate a private key dsi 715A and a public key, Qsi. For example, any suitable public key infrastructure may be used, such as through certificate authorities (CAs), web of trust (WoT), simple public key infrastructure (spki), or Elliptic-curve Diffie-Hellman.

VI. Example Installation Data Flows

The following describe data flows for installing a trusted device according to embodiments. This may include generating trust data, generating share data, storing shares, loading shares, and copying an existing shares on a device. The data flows describe examples for setting up one or more devices into an exemplary system, although other solutions can be used to set-up the system of FIG. 1 and implement the methods described in sections II-A and IV-B above.

A. Generating Trust Data at Installation/Registration Time

Figure 8:
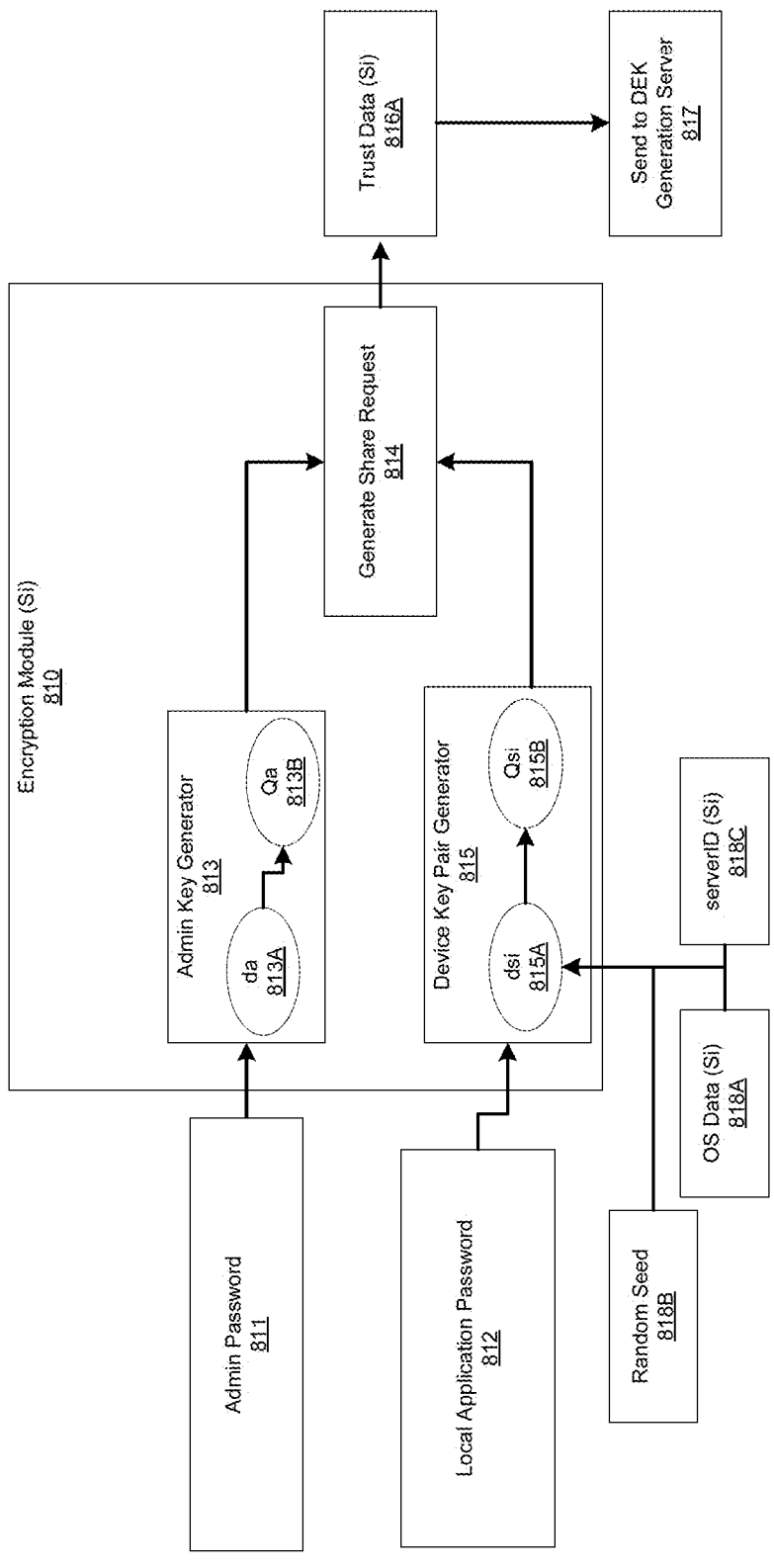
FIG. 8 shows a data flow diagram for generating trust data according to an embodiment.

FIG. 8 shows a data flow diagram for generating trust data according to an embodiment. According to embodiments, each server (e.g. server Si 410 of FIG. 4) in a trusted network may generate trust data, such as trust data (Si) 816. It should be understood, that reference to a server, such as server Si 810, may refer to any type of computing device within the trusted network (e.g. personal computers, mobile phones, IoT devices, etc.). As previously explained, trust data may include a certificate, which in one embodiment may be generated on a computing device of the trusted network. Generation of trust data can occur in an encryption module (Si) 810 of each server upon installation and registration into the trusted network.

In an embodiment, an admin password 811 may be used to generate an admin public-private key pair (or other user public-private key pair) comprising private key da 813A and public key Qa 813B. For example, a key derivation function of admin key generator 813 (or other user key generator) can be used to transform the admin password 811 into a long string of characters that can be used as admin private key da 813A (or other user private key). In one embodiment, private key da 813A and public key Qa 813B can be used to generate an admin digital signature (or other user digital signature). For example, to communicate the validity of a data message or portions of data contained therein, private key da 813A can be used as an input into a digital signature algorithm, along with the data message or the portions of data contained therein, to produce a digital signature. The admin digital signature can then be verified at a later point in time by a verifying device or verifying server using a verification algorithm that utilizes admin public key Qa 813B to determine if the digital signature matches expected results.

Encryption Module (Si) 810 may comprise a local private key dsi 815A and local public key Qsi 815B. In the embodiment, the local private key dsi 815A and local public key Qsi 815B may not be stored in persistent memory, such that they may not exist on the local server when the server is turned off. At run time, or when a local server is turned on, a local private key dsi 815A may be regenerated from random seed 818B, operating system data 818A, and server identifier 818C using instructions of device key generator 815, which may further derive public key Qsi 815B from dsi 815A. For example, device key generator 815 may comprise code for a key derivation function, such as PDKF2( ). In one embodiment, regeneration of the private key dsi 815A and public key Qsi 815B may require a local application password 812. For example, the local application password 812 may be a phrase, string of characters, or biometric sample that can be entered by a user into the local server/computing device. In embodiments, the local private key 815A and local public key 815B can be used to generate a device digital signature.

In one embodiment, a share request 814 may generated. Share request 814 may be a request for one or more data encryption key shares according to embodiments. In one embodiment, the share request 814 may be signed using both an admin digital signature and device digital signature. According to embodiments, the admin digital signature and device digital signature can be verified by a trusted device in the trusted peer to peer network in order to validate the share request 814. Thus, the share request 814 that has been digitally signed can serve as trust data (Si) 816 for generating a data encryption key and/or shares thereof. Trust data (Si) 816 generated at boot time of the server may be sent to a DEK generation server to generate a DEK that can be used for secure peer to peer communications between trusted devices.

B. Generating Requested Shares at Installation

Figure 9:
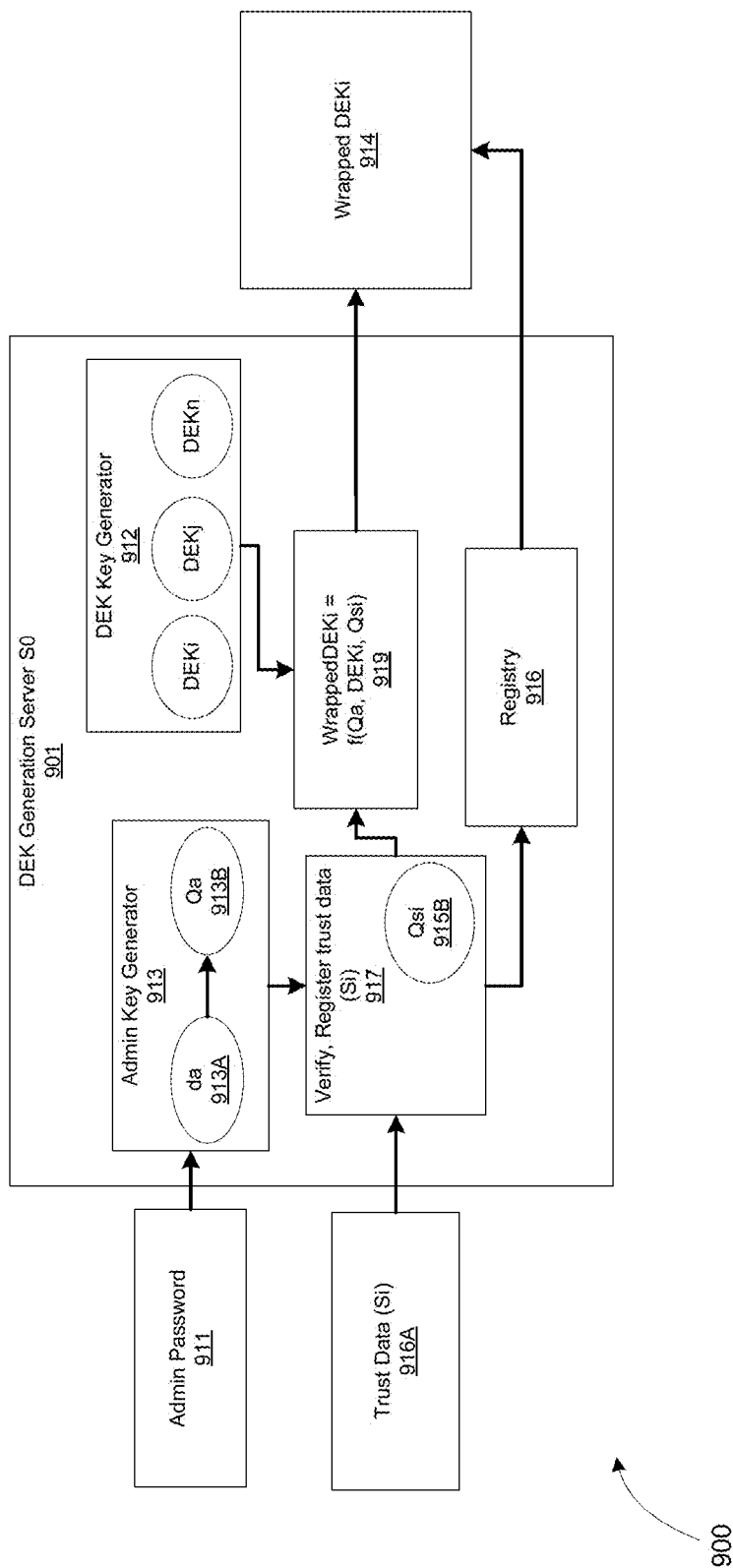
FIG. 9 shows a data flow diagram for generating one or more requested DEK shares according to an embodiment.

FIG. 9 shows a data flow diagram for generating one or more requested DEK shares according to an embodiment. A DEK generation server SO 901 may be used to create a data encryption key (DEK) and shares thereof. In an embodiment, the DEK generation server SO may create the DEK and DEK shares upon initiation by one or more devices/servers in a trusted network. For example, a server Si may initiate the DEK creation upon boot up. The server Si can be, for example, a server Si to which encryption module (Si) 810 of FIG. 8 is attributed to.

In one embodiment, creation of a DEK initiated by a server Si may require a verification of trust data (Si) 916 received from the server Si. The trust data (Si) 916A may be verified by comparing one or more digital signatures of the trust data (Si) 916A to expected results, and determining that a match exists. In one embodiment, the one or more digital signatures may comprise an admin digital signature. To verify the admin digital signature, DEK generation server SO may first generate an admin private key 913A using instructions of admin key generator 913. In one embodiment, this may require an admin password 911. Admin key generator 913 may derive the admin private key 913A from the admin password 911 and may further derive the admin public key 913B from the private key da 913A. Public key 913B may then be used to verify trust data (SI) 916A. The verification 917 may comprise regenerating the admin digital signature using the public admin key 913B and comparing to trust data (Si) 916A.

In one embodiment, upon successful verification of trust data (Si) 916A, DEK generation server SO 901 may register trust data (Si) 916A. Registering trust data (Si) 916A may comprise associating the verified trust data (Si) 916A with a public key Qsi 915B of server Si and storing in registry 916. Upon successful verification and registration of trust data (si) 916A, DEK generation server SO 901 may generate a DEK and split the DEK into N number of DEK shares (e.g. DEKi, DEKj . . . DEKn). DEK generation server SO may then wrap/encrypt the share requested by server Si, DEKi. The wrapped DEKi 914 may be formed according to a key wrap function 919 (e.g. AESKW, OPACITY, etc.), which in one embodiment may be a function of the admin public key 913B, requested share DEKi, and of server SI public key Qsi 915B. In one embodiment, public key Qsi 915B may be retrieved from registry 916. Upon successful encryption, wrapped DEKi 914 may then be sent to the requesting server Si.

C. Storing Local Share in Registry

Figure 10:
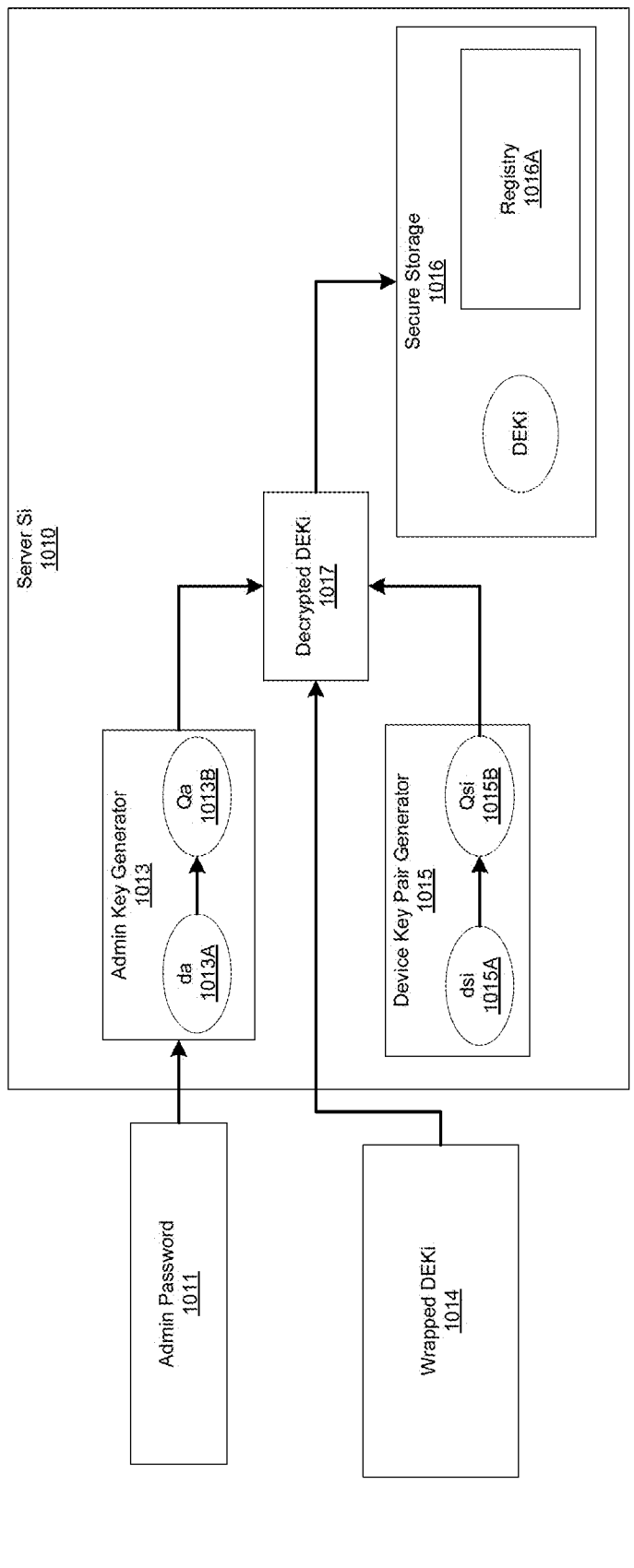
FIG. 10 shows a data flow diagram for registering a local data encryption key share according to an embodiment.

FIG. 10 shows a data flow diagram for registering a local data encryption key share according to an embodiment. In an embodiment, a wrapped/encrypted data encryption key share, wrapped DEKi 1014 may be received by server Si 1010 from a DEK generation server S0. The DEK generation server SO can be, for example, DEK generation server S0 901 of FIG. 9.

In one embodiment, wrapped DEki 1014 may be decrypted by server Si 1010 using a private admin key da 1013A and a local device private key dsi 1015A. Admin private key 1013A and admin public key Qa 1013B may be generated by server Si 1010 using instructions of admin key generator 1013. In one embodiment, generation of the admin public and private keys may require an admin password 101. Local device private key dsi 1015A and local device public key 1015 may be generated by server Si 1010 using instructions of device key pair generator 1015. Decrypted DEki 1017 may then be stored in a secure storage 1016 of server Si 1010, and may be registered by server Si 1010 by associating the DEKi with the local device public key Qsi 1015B in registry 1016A. In one embodiment, access to secure storage 1016 may require private key dsi 1015A.

D. Loading Shares At Boot/Run Time

Figure 11:
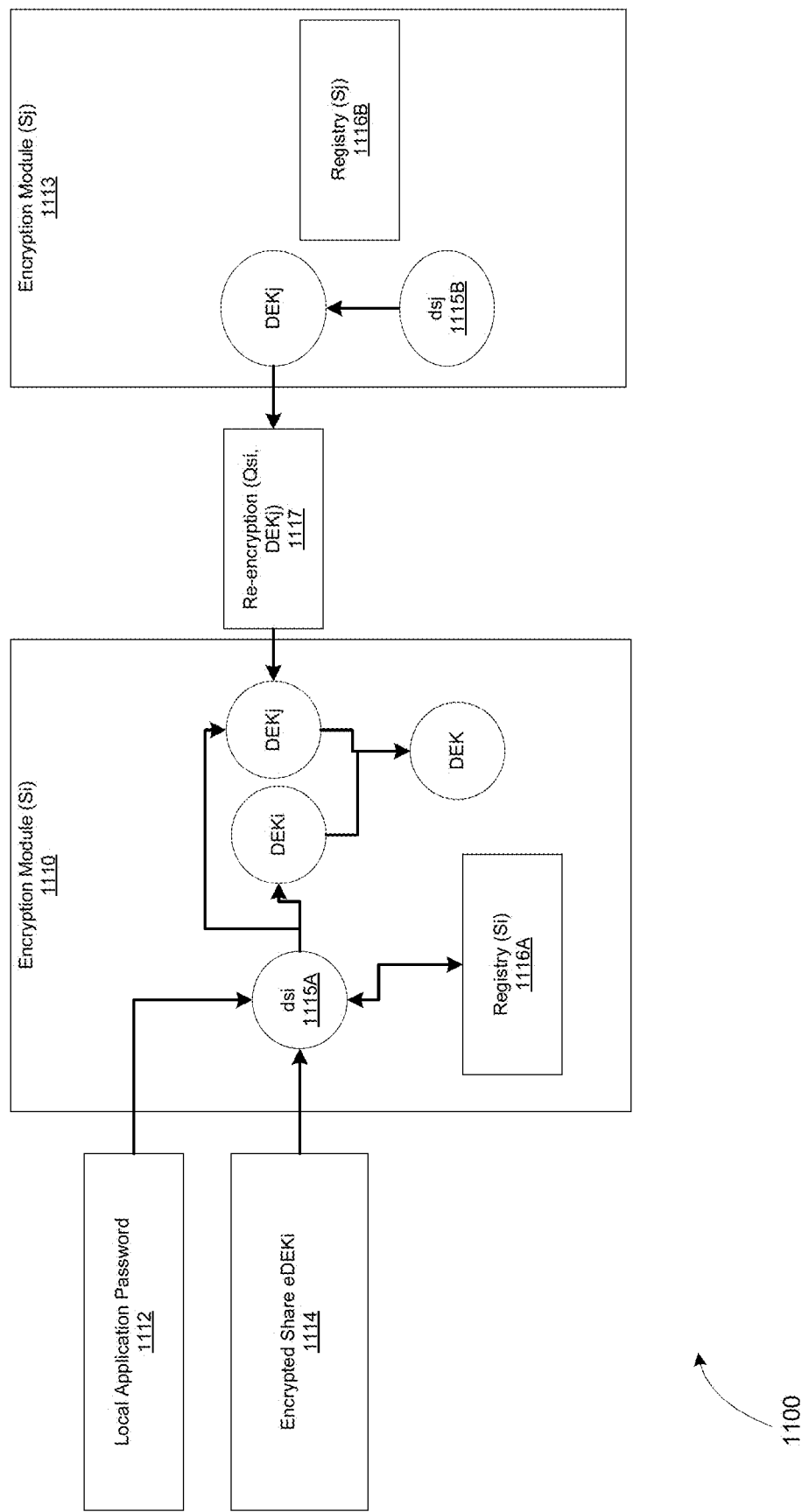
FIG. 11 shows a data flow diagram for loading a data encryption key share(s) during boot time of a device according to an embodiment.

FIG. 11 shows a data flow diagram for loading a data encryption key share(s) during boot time of a device according to an embodiment. After installation, to load the key shares at run time of the device/server, communication with one or more other servers in a trusted network may be required. In embodiments, communication between M of N devices in a network may occur for generating a data encryption key (DEK).

A local encrypted share eDEKi 1114 may be retrieved and decrypted at the encryption module (Si) 1110 of a requesting server. The requesting server may be, for example, requesting trusted device 10 of FIG. 1. In embodiments, the encrypted share eDEKi may be decrypted using a local private key dsi 115A. The decrypted local share DEKi may be the first share of M required shares for generating a DEK. To retrieve the remaining M−1 shares, M−1 trusted devices may be located. The location of the M−1 trusted devices may be retrieved from registry (Si) 1116A. In one embodiment, the information retrieved from registry (Si) 1116A may be encrypted, and may be decrypted using the requesting server's local private key dsi 1115A. In one embodiment, use of the private key 1115A for decryption may require a local application password.

On an encryption module (Sj) 1113 of M−1 devices, a local encryption share DEKj may be retrieved. The local encryption share DEKj may be decrypted using a local private key dsj 1115B. In one embodiment, retrieval and/or decryption of the encryption share may require a verification of a certificate of the requesting server, through a comparison to one or more certificates stored at registry (Sj) 1116B. Each of M−1 local shares DEKj may be re-encrypted using the public key Qsi of the requesting server. Each of the M−1 re-encrypted shares 1117 may be retrieved by the requesting server and may be decrypted using the requesting server's private key dsi 1115A. According to embodiments, the DEK may then be generated from the local DEK share DEKi and the M−1 shares DEKj retrieved from the other devices in the network.

E. Copying Existing Share

Figure 12:
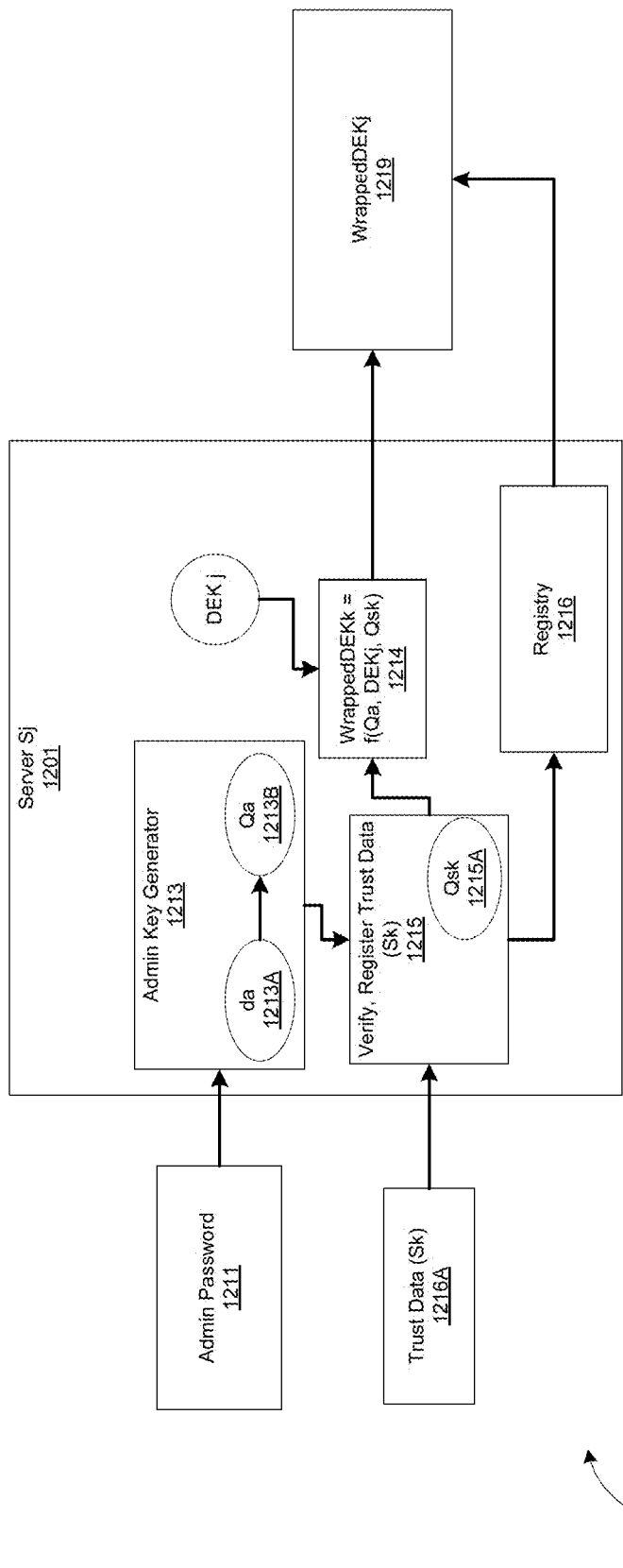
FIG. 12 shows a data flow diagram for copying a data encryption key share according to embodiment.

FIG. 12 shows a data flow diagram for copying a data encryption key share according to embodiment. In an embodiment, an existing share stored at a first trusted device of a trusted network can be copied and sent to a second trusted device. The first trusted device, server Sj 1201 may receive trust data (Sk) 1216A from the second trusted device. The first trusted device and second trusted device may be, for example, first trusted device 11 and second trusted device 12 of FIG. 1 respectively.

To verify one or more digital signatures of trust data (Sk) 1216A, server Sj 1201 may generate an admin private key 1213A using instruction of admin key generator 1213. In one embodiment, generation of the admin key may require an admin password 1211. The admin private key 1213A may further be used to generate an admin public key Qa 1213B. From the admin public key Qa 1213B, an admin digital signature of trust data (Sk) 1216A may be verified. Furthermore, the verified trust data 1215 may be associated with a public key Qsk 1215A and registered into registry 1216. An existing DEK share, DEKj, may then be copied and encrypted. The encryption may be performed according to wrapping function 1214, that may be a function of Qa 1213B, DEKj, and Qsk 1215A. The copied DEK share, WrappedDEKj 1219, may be sent to the second trusted device.

VII. Computer System

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems in a computer system may be interconnected via a system bus.

Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB, Fire Wire®). For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method performed by a computing device, the method comprising:
    receiving, from a requesting device in a trusted network, a share request for a share of a data encryption key, the trusted network including the requesting device, the computing device, and one or more other computing devices;
    retrieving a first encrypted local share of the data encryption key from a memory, wherein the first encrypted local share of the data encryption key is encrypted using a local public key of the computing device;
    decrypting the first encrypted local share using a local private key of the computing device to obtain a local share, wherein the local private key is derived by a key generator using a plurality of derivation components including a network address of the computing device, a random number generated by the computing device, and an encrypted secret of the computing device, and wherein the local public key of the computing device is derived based on the local private key;
    re-encrypting the local share using a public key of the requesting device to obtain a second encrypted local share; and
    sending the second encrypted local share to the requesting device, wherein the requesting device (1) generates the data encryption key from (a) the second encrypted local share and one or more encrypted local shares received from the one or more other computing devices and (b) a local encrypted share stored in the requesting device and (2) uses the data encryption key to perform a cryptographic operation.

2. The method of claim 1, wherein the share request comprises a certificate or identifier associated with the certificate for the requesting device, the method further comprising:
    comparing the certificate for the requesting device to a registry of certificates for N devices in the trusted network; and
    determining that the requesting device is trusted based on the comparing.

3. The method of claim 1, wherein a total number of devices included in the trusted network is N devices, the computing device generating the data encryption key from M of N shares, wherein N is an integer, and M is an integer less than or equal to N.

4. The method of claim 1, wherein the local private key and the local public key are generated by:
    generating the random number;
    obtaining the network address of the computing device;
    sending the random number and the network address of the computing device to the key generator as derivation components, wherein the key generator derives the local private key from the derivation components and derives the public key from the local private key;
    receiving the local private key and the local public key from the key generator; and
    storing the local private key and the local public key in the memory of the computing device.

5. The method of claim 4, wherein decrypting the local share comprises:
    retrieving the local private key from the memory of the computing device; and
    decrypting the local share using the local private key.

6. The method of claim 1, further comprising:
    checking one or more of: a location of the requesting device, an authentication state of the requesting device, and system parameters of the requesting device; and
    authenticating the requesting device based on the checking.

7. The method of claim 3, wherein the N shares of the data encryption key are shares in a Shamir's Secret Sharing Scheme.

8. A system comprising:
    one or more processors; and
    a non-transitory computer readable medium storing a plurality of instructions that, when executed, control the one or more processors to perform a method comprising:
        receiving, from a requesting device in a trusted network, a share request for a share of a data encryption key, the trusted network including the requesting device, a computing device, and one or more other computing devices;

retrieving a first encrypted local share of the data encryption key from a memory, wherein the first encrypted local share of the data encryption key is encrypted using a local public key of the computing device;

decrypting the first encrypted local share using a local private key of the computing device to obtain a local share, wherein the local private key is derived by a key generator using a plurality of derivation components including a network address of the computing device, a random number generated by the computing device, and an encrypted secret of the computing device, and wherein the local public key of the computing device is derived based on the local private key;

re-encrypting the local share using a public key of the requesting device to obtain a second encrypted local share; and sending the second encrypted local share to the requesting device, wherein the requesting device (1) generates the data encryption key from (a) one or more shares including the second encrypted local share and one or more encrypted local shares received from the one or more other computing devices and (b) a local encrypted share stored in the requesting device and (2) uses the data encryption key to perform a cryptographic operation.

9. The system of claim 8, wherein the share request comprises a certificate or identifier associated with the certificate for the requesting device, the method further comprising:

comparing the certificate for the requesting device to a registry of certificates for N devices included in the trusted network; and determining that the requesting device is trusted based on the comparing.

10. The system of claim 8, wherein N is an integer, and wherein M is an integer less than or equal to N.

11. The system of claim 8, wherein the local private key and the local public key are generated by:

generating the random number;

obtaining the network address of the computing device;

sending the random number and the network address of the computing device to the key generator as derivation components, wherein the key generator derives the local private key from the derivation components and derives the public key from the local private key;

receiving the local private key and the public key from the key generator; and storing the local private key and the local public key in the memory of the computing device.

12. The system of claim 11, wherein decrypting the local share comprises:

retrieving the local private key from the memory of the computing device; and decrypting the local share using the local private key.

13. The system of claim 8, wherein the method further comprises:

checking one or more of: a location of the requesting device, an authentication state of the requesting device, and system parameters of the requesting device; and authenticating the requesting device based on the checking.

14. The system of claim 8, wherein N shares of the data encryption key are shares in a Shamir's Secret Sharing Scheme.

15. A non-transitory computer readable medium storing specific computer-executable instructions that, when executed by a processor, cause:

receiving, from a requesting device in a trusted network, a share request for a share of a data encryption key, the trusted network including the requesting device, a computing device, and one or more other computing devices;

retrieving a first encrypted local share of the data encryption key from a memory, wherein the first encrypted local share of the data encryption key is encrypted using a local public key of the computing device;

decrypting the first encrypted local share using a local private key of the computing device to obtain a local share, wherein the local private key is derived by a key generator using a plurality of derivation components including a network address of the computing device, a random number generated by the computing device, and an encrypted secret of the computing device, and wherein the local public key of the computing device is derived based on the local private key;

re-encrypting the local share using a public key of the requesting device to obtain a second encrypted local share; and sending the second encrypted local share to the requesting device, wherein the requesting device (1) generates the data encryption key from (a) one or more shares including the second encrypted local share and one or more encrypted local shares received from the one or more other computing devices and (b) a local encrypted share stored in the requesting device and (2) uses the data encryption key to perform a cryptographic operation.

16. The non-transitory computer readable medium storing specific computer-executable instructions of claim 15, wherein the share request comprises a certificate or identifier associated with the certificate for the requesting device, the processor being further configured for:

comparing the certificate for the requesting device to a registry of certificates for N devices included in the trusted network; and determining that the requesting device is trusted based on the comparing.

17. The non-transitory computer readable medium storing specific computer-executable instructions of claim 15, wherein N is an integer, and wherein M is an integer less than or equal to N.

18. The non-transitory computer readable medium storing specific computer-executable instructions of claim 15, wherein the local private key and the local public key are generated by:

generating the random number;

obtaining the network address of the computing device;

sending the random number and the network address of the computing device to the key generator as derivation components, wherein the key generator derives the local private key from the derivation components and derives the public key from the local private key;

receiving the local private key and the public key from the key generator; and storing the local private key and the local public key in the memory of the computing device.

19. The non-transitory computer readable medium storing specific computer-executable instructions of claim 15, wherein decrypting the local share comprises:
- retrieving the local private key from the memory of the computing device; and
- decrypting the local share using the local private key.

20. The non-transitory computer readable medium storing specific computer-executable instructions of claim 15, wherein N shares of the data encryption key are shares in a Shamir's Secret Sharing Scheme.

* * * * *